US009361793B2

(12) United States Patent
Curtis et al.

(10) Patent No.: US 9,361,793 B2
(45) Date of Patent: *Jun. 7, 2016

(54) SYSTEMS AND METHODS FOR DISTANCE AND CONGESTION-AWARE RESOURCE DEPLOYMENT

(71) Applicant: PALANTIR TECHNOLOGIES INC., Palo Alto, CA (US)

(72) Inventors: Spike Curtis, Sacramento, CA (US); Dustin Janatpour, San Mateo, CA (US); Drew Bailey, Falls Church, VA (US)

(73) Assignee: Palantir Technologies Inc., Palo Alto, CA (US)

( * ) Notice: Subject to any disclaimer, the term of this patent is extended or adjusted under 35 U.S.C. 154(b) by 37 days.

This patent is subject to a terminal disclaimer.

(21) Appl. No.: 14/302,279

(22) Filed: Jun. 11, 2014

(65) Prior Publication Data

US 2015/0120176 A1    Apr. 30, 2015

Related U.S. Application Data

(63) Continuation of application No. 14/062,835, filed on Oct. 24, 2013, now Pat. No. 8,786,605.

(51) Int. Cl.
*G08G 1/00* (2006.01)
*G06T 11/20* (2006.01)
(Continued)

(52) U.S. Cl.
CPC .............. *G08G 1/00* (2013.01); *G06Q 10/047* (2013.01); *G06Q 10/06* (2013.01); *G06Q 10/08* (2013.01);
(Continued)

(58) Field of Classification Search
CPC .............. G09G 5/14; G09G 2340/10; G09G 2340/125; G06T 11/60; G06T 11/206; H04N 5/44504; G06F 3/0481; G06F 17/246; H04L 12/2458; G06Q 10/10
See application file for complete search history.

(56) References Cited

U.S. PATENT DOCUMENTS 5,568,390 A   10/1996  Hirota et al.
5,857,329 A    1/1999  Bigham
(Continued)

FOREIGN PATENT DOCUMENTS

EP   1926074   5/2008
EP   2555126   2/2013
EP   2876587   5/2015

OTHER PUBLICATIONS

Ballesteros et al., "Batching: A Design Pattern for Efficient and Flexible Client/Server Interaction," Transactions on Pattern Languages of Programming, Springer Berlin Heildeberg, 2009, pp. 48-66.
(Continued)

*Primary Examiner* — Todd Buttram
(74) *Attorney, Agent, or Firm* — Finnegan, Henderson, Farabow, Garrett & Dunner, LLP

(57) ABSTRACT

Computer-implemented systems and methods are disclosed for distance and congestion-aware resource deployment. In some embodiments, a method is provided to estimate a vehicle deployment region. The method includes constructing a graph data structure using at least in part a single invocation of a form of Dijkstra's algorithm. The method additionally includes partitioning an angular space centered on a vehicle location into a plurality of angular space regions, the vehicle location corresponding to a current or potential location of the vehicle. The method also includes selecting, for at least three of the plurality of the partitioned angular space regions, a geographical location within the angular space region, wherein each selected geographical location in an angular space region is a geographical location furthest from the vehicle location, and wherein each selected geographical location was determined, using the graph data structure, to be reachable from the vehicle location within a specified maximum cost. The method further includes forming a polygon representing a vehicle deployment region from the selected geographical locations.

34 Claims, 14 Drawing Sheets

(51) Int. Cl.
| | |
|---|---|
| G06Q 10/06 | (2012.01) |
| G06T 17/05 | (2011.01) |
| G06Q 10/04 | (2012.01) |
| G06Q 10/08 | (2012.01) |
| G06Q 50/26 | (2012.01) |
| G06Q 50/28 | (2012.01) |
| G06T 11/60 | (2006.01) |

(52) U.S. Cl.
CPC .............. *G06Q 50/26* (2013.01); *G06Q 50/28* (2013.01); *G06T 11/206* (2013.01); *G06T 11/60* (2013.01); *G06T 17/05* (2013.01); *G08G 1/205* (2013.01)

(56) References Cited

U.S. PATENT DOCUMENTS

| | | | |
|---|---|---|---|
| 5,902,349 | A | 5/1999 | Endo et al. |
| 6,496,774 | B1 | 12/2002 | Davies |
| 6,608,559 | B1 | 8/2003 | Lemelson et al. |
| 7,603,229 | B2 | 10/2009 | Goldberg et al. |
| 7,818,291 | B2 | 10/2010 | Ferguson et al. |
| 7,941,321 | B2 | 5/2011 | Greenstein et al. |
| 8,042,110 | B1 | 10/2011 | Kawahara et al. |
| 8,046,283 | B2 | 10/2011 | Burns |
| 8,108,138 | B2 | 1/2012 | Bruce et al. |
| 8,352,174 | B2 | 1/2013 | Milstein et al. |
| 8,417,409 | B2 | 4/2013 | Bast et al. |
| 8,763,078 | B1 | 6/2014 | Castellucci et al. |
| 8,786,605 | B1 * | 7/2014 | Curtis .................... G06Q 10/06 340/995.1 |
| 2004/0153418 | A1 | 8/2004 | Hanweck |
| 2006/0241856 | A1 | 10/2006 | Cobleigh et al. |
| 2007/0088596 | A1 | 4/2007 | Berkelhamer et al. |
| 2007/0198571 | A1 | 8/2007 | Ferguson et al. |
| 2008/0301559 | A1 | 12/2008 | Martinsen et al. |
| 2008/0313281 | A1 | 12/2008 | Scheidl et al. |
| 2009/0037912 | A1 | 2/2009 | Stoitsev et al. |
| 2009/0319418 | A1 | 12/2009 | Herz |
| 2010/0162371 | A1 | 6/2010 | Geil |
| 2011/0041084 | A1 | 2/2011 | Karam |
| 2012/0101952 | A1 | 4/2012 | Raleigh et al. |
| 2012/0290506 | A1 | 11/2012 | Muramatsu et al. |
| 2013/0036346 | A1 | 2/2013 | Cicerone |
| 2013/0231862 | A1 | 9/2013 | Delling et al. |
| 2014/0081685 | A1 | 3/2014 | Thacker et al. |
| 2015/0120176 | A1 | 4/2015 | Curtis et al. |
| 2015/0261817 | A1 | 9/2015 | Harris et al. |

OTHER PUBLICATIONS

Bogle et al., "Reducing Cross-Domain Call Overhead Using Batched Futures," SIGPLAN No. 29, 10 (Oct. 1994) pp. 341-354.

Chen et al., "A Novel Emergency Vehicle Dispatching System," 2013 IEEE 77th Vehicular Technology Conference, IEEE, Jun. 2, 2013, 5 pages.

Eklund et al., "A Dynamic Multi-source Dijkstra's Algorithm for Vehicle Routing," Intelligent Information Systems, 1996, pp. 329-333.

Hart et al., "A Formal Basis for the Heuristic Determination of Minimum Cost Paths," IEEE Transactions on Systems Science and Cybernetics, IEEE, vol. 1, No. 2, Jul. 1, 1968, pp. 100-107.

Jotshi et al., "Dispatching and Routing of Emergency Vehicles in Disaster Mitigation Using Data Fusion," Socio-Economic Planning Sciences, Pergamon, Amsterdam, Netherlands, vol. 43, No. 1, Mar. 1, 2009, 24 pages.

Mohring et al., "Partitioning Graphs to Speedup Dijkstra's Algorithm," ACM Journal of Experimental Algorithmics, Association of Computing Machinery, New York, New York, vol. 11, Jan. 1, 2006, 29 pages.

Stamos et al., "Remote Evaluation," Journal ACM Transactions on Programming Languages and Systems (TOPLAS), vol. 12, Issue 4, Oct. 1990, pp. 537-564.

Yang et al., "An Enhanced Routing Method with Dijkstra Algorithm and AHP Analysis in GIS-based Emergency Plan," Geoinformatics, 2010 18th International Conference on, IEEE, Piscataway, New Jersey, Jun. 18, 2010, 6 pages.

Official Communication for European Patent Application No. 14162372.8 dated Apr. 30, 2015.

Official Communication for German Patent Application No. 10 2013 221 057.4 dated Mar. 23, 2015.

Official Communication for German Patent Application No. 10 2013 221 052.3 dated Mar. 24, 2015.

Notice of Allowance for U.S. Appl. No. 13/826,228 dated Mar. 27, 2015.

Official Communication for U.S. Appl. No. 14/196,814 dated May 5, 2015.

Official Communication for U.S. Appl. No. 13/657,656 dated May 6, 2015.

Official Communication for U.S. Appl. No. 14/302,279 dated Sep. 24, 2015.

Official Communication for U.S. Appl. No. 13/196,788 dated Oct. 23, 2015.

Official Communication for U.S. Appl. No. 13/196,788 dated Nov. 25, 2015.

Reedy, Sarah, "Policy and Charging Rules Function (PCRF)," Sep. 13, 2010, http://www.lightreading.com/document.asp?doc_id=680015 printed Dec. 10, 2013 in 4 pages.

Vose et al., "Help File for ModelRisk Version 5," 2007, Vose Software, pp. 349-353. [Uploaded in 2 Parts].

Wagner et al., "Dynamic Shortest Paths Containers," Electronic Notes in Theoretical Computer Science, vol. 92, No. 1, 2003, pp. 1-19.

Official Communication for New Zealand Patent Application No. 623323 dated Apr. 17, 2014.

Official Communication for New Zealand Patent Application No. 623323 dated Jun. 6, 2014.

* cited by examiner

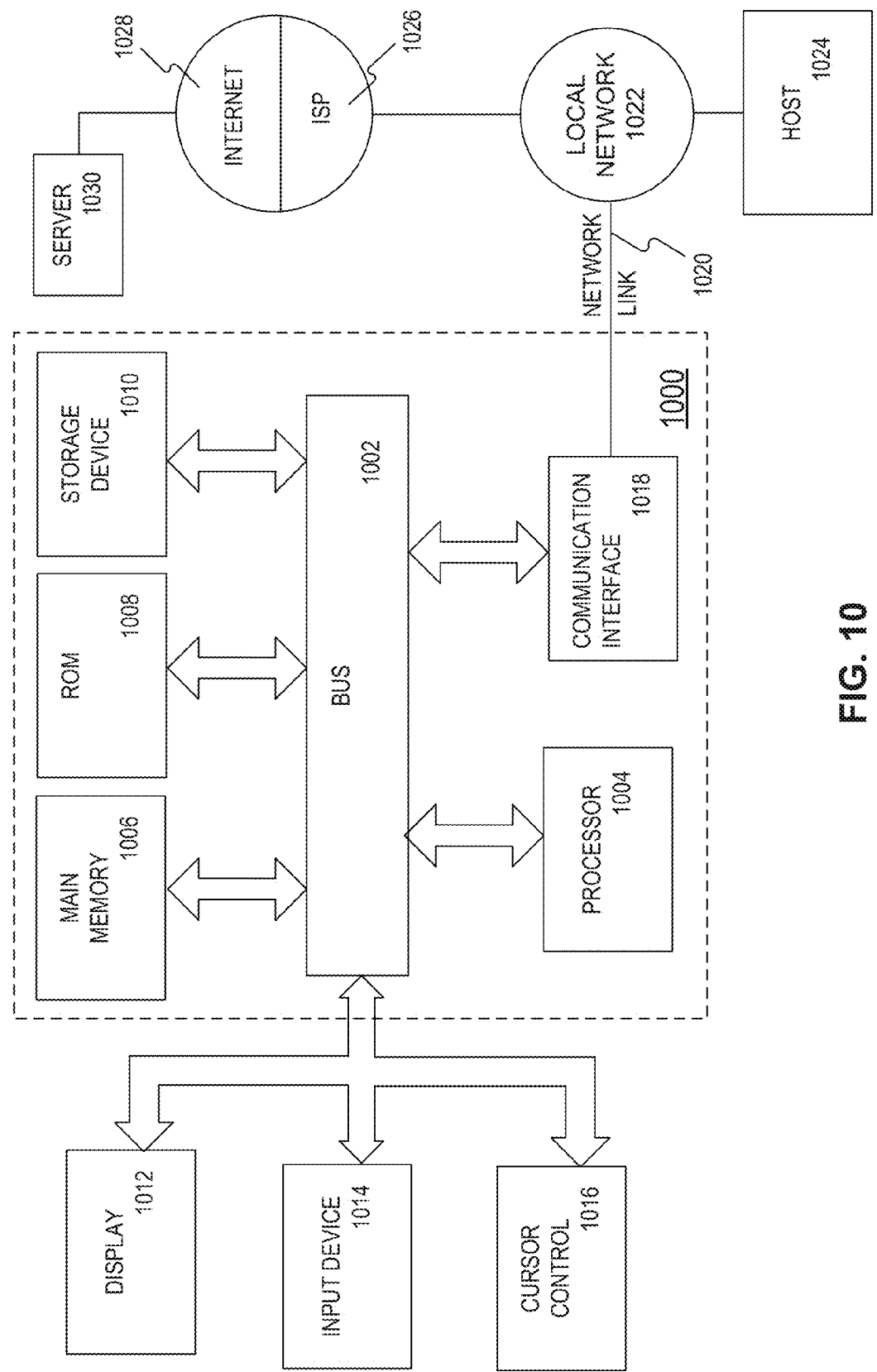

SYSTEMS AND METHODS FOR DISTANCE AND CONGESTION-AWARE RESOURCE DEPLOYMENT

REFERENCE TO RELATED APPLICATION(S)

This application is a continuation of U.S. Non-Provisional patent application Ser. No. 14/062,835, filed on Oct. 24, 2013, the disclosure of which is expressly incorporated herein by reference in its entirety.

BACKGROUND

With the growth of urban centers and metropolitan areas, public service providers and other entities often find it difficult to navigate and reach specific locations within a short or reasonable amount of time. This problem is particularly acute for law enforcement and medical professionals responding to emergencies. Traffic is often a significant factor in estimating a response time in any major city or metropolitan area. Although many modern service vehicles include navigation systems and communications equipment for reducing the transit time to a location, a need still exists for improvements in congestion awareness and reductions in response times.

Some service providers are deployed based on historical traffic and incident patterns. For example, experienced police officers accustomed to responding to calls in particular neighborhoods may prefer to travel on particular streets based on perceived efficiencies arising from their individual experiences. Additionally, a police force may schedule a particular number of police vehicles to patrol a given area at specific time periods independent of whether those vehicles are currently engaged in calls or are idle, including potentially following similar or even overlapping patrol patterns within the area.

Even if scheduling of vehicles could be improved to avoid inefficiencies due to route or region overlaps, these deployment approaches would still be inherently inefficient because they do not account for dynamic or real-time changes in traffic or incident patterns. Current deployment approaches are also inefficient because they do not account for vehicle accessibility changes within an area due to factors such as road construction or traffic accidents. Therefore, a need exists for improved service provider deployment efficiency.

BRIEF DESCRIPTION OF THE DRAWINGS

Reference will now be made to the accompanying drawings that illustrate exemplary embodiments of the present disclosure, and in which:

FIG. 10 is block diagram of an exemplary computer system within which the embodiments described herein can be implemented, consistent with some embodiments of the present disclosure.

DETAILED DESCRIPTION OF EXEMPLARY EMBODIMENTS

Reference will now be made in detail to embodiments, examples of which are illustrated in accompanying drawings. Whenever possible, consistent reference numbers will be used throughout the drawings to refer to the same or like parts.

Figure 1:
FIG. 1 depicts an exemplary map of a portion of a geographic area.

FIG. 1 depicts an exemplary map 100 of a geographic area, such as a portion of a city or town. As shown, exemplary map 100 and zoomed-in portion thereof illustrate street topologies that include two-way streets and one-way streets. For example, Montana Avenue is a two-way street based on the absence of any directional limitations illustrated in the map while 24th Street is a one-way street based on the presence of a directional limitation illustrated in the map.

In some embodiments, street segments are portions of a street between two points comprising an intersection or terminus. In the context of street topologies, a terminus represents the end of a street; e.g., a cul de sac. In the context of street topologies, the terms "intersect" or "intersection" apply to street topologies involving a first street that meets or intersects a second street through a street topology not involving a vertical separation at that location (e.g., a traditional meeting or intersection of two roads at a common elevation).

In the same context, the terms "cross" or "crossing" apply to street topologies involving a first street that traverses or crosses under or over a second street through a street topology involving a vertical separation between streets (e.g., a bridge, an overpass, or a tunnel). In some embodiments, a crossing of a first street over a second street may be supplemented with one or more street topologies that allow traversal between the first street and the second street, such as a highway off-ramp or access road, notwithstanding the vertical separation between the first and second streets inherent in the crossing of those streets. Thus, in some embodiments, an intersection involving two streets allows for traversing between those streets while a crossing involving two streets does not allow traversing between those streets absent one or more supplemental street topologies.

For example, as illustrated in map 100, 20th Street may be partitioned into street segments between intersections such as the intersection of 20th Street and Alta Avenue as well as the intersection of 20th Street and Montana Avenue. In some embodiments, as previously discussed, street segments may also be portions of a street between a terminus of that street and an intersecting street (not illustrated in FIG. 1).

Figure 2:
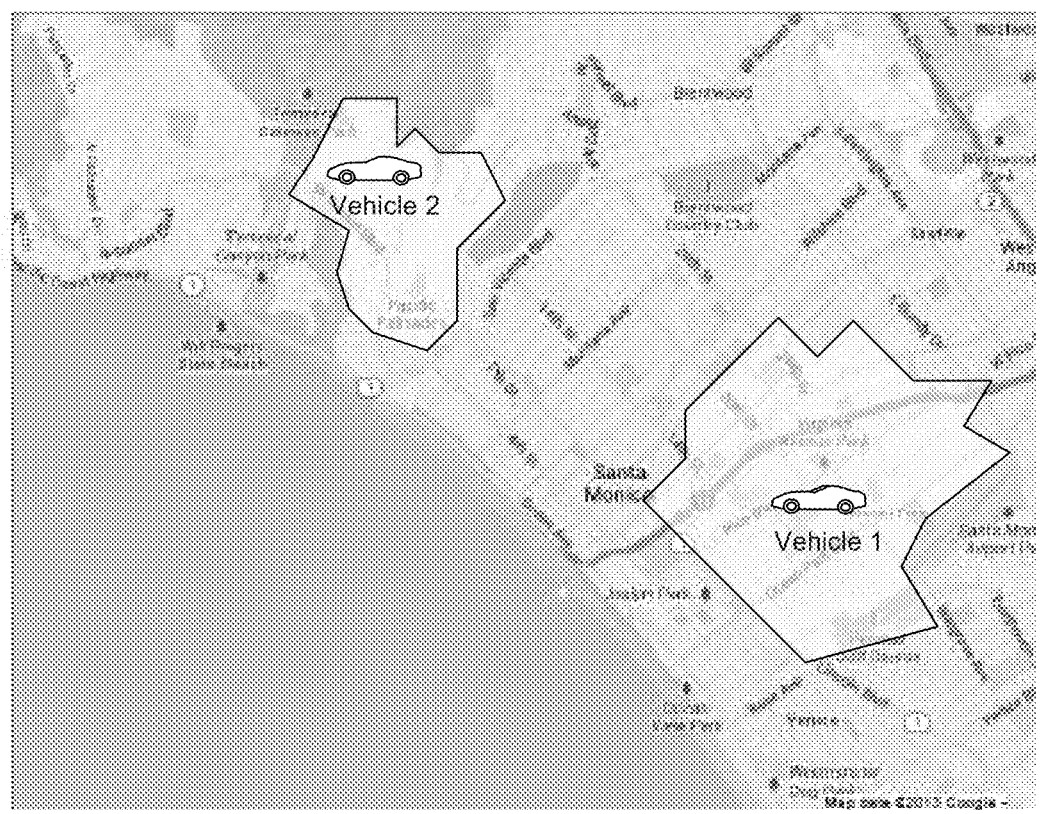
FIG. 2 depicts an exemplary map of a portion of a geographic area with vehicle deployment regions overlaid, consistent with some embodiments of the present disclosure.

FIG. 2 depicts an exemplary map 200 of a portion of a geographic area with vehicle deployment regions overlaid, consistent with some embodiments of the present disclosure. A vehicle deployment region is a geographic area that can be reached by a vehicle, from a particular geographic location within the vehicle deployment region, at a cost less than or equal to a specified maximum cost. In some embodiments, the particular geographic location may represent a current geographic location of a deployed vehicle such as a police car; i.e., a "current vehicle deployment location" of the police car. In other embodiments, the particular geographic location may represent a potential geographic location to which a vehicle, such as a police car, could be deployed; i.e., a "potential vehicle deployment location" for the police car. In some embodiments utilizing travel time within a cost function, the specified maximum cost may reflect at least in part a required response time to travel from the particular geographic location, reflecting either a current or potential vehicle deployment location, to a new geographic location.

In some embodiments, vehicle deployment regions may differentiate between vehicle types and/or required response times through use of one or more visual techniques such as color differentiation. For example, fire trucks with a required response time of 10 minutes may have red-colored vehicle deployment regions encompassing geographic locations reachable from a current or potential vehicle deployment location within 10 minutes. In another example, police cars with a required response time of 8 minutes may have blue-colored vehicle deployment regions encompassing geographic locations reachable from a current or potential vehicle deployment location within 8 minutes. Of course, embodiments of the present invention are not limited to fire trucks and police cars and may be implemented for any type of vehicle, including service equipment or military vehicles, for example. Moreover, other response times or durations may be used or required.

In some embodiment, other visual techniques may differentiate between vehicle deployment regions for different vehicle types and/or required response times. For example, vehicle deployment regions for different vehicle types or required response times may be distinguished by the type of line used for the perimeter of the vehicle deployment region (e.g., a solid line versus a dashed or other line) and/or the type of fill used for the vehicle deployment region (e.g., a solid fill versus a crosshatched, transparent, or other type of fill). Other visual techniques for differentiating between vehicle deployment regions for different vehicle types or required response times are possible and the visual techniques described above are merely exemplary.

In some embodiments, vehicles deployment regions for a plurality of vehicle types and/or required response times can be concurrently or separately overlaid on a map. In some embodiments, display of vehicle deployment regions for each vehicle type and/or required response time, and/or display of individual vehicle deployment regions, can be enabled or disabled by interacting with a user interface element, thereby allowing selective display of vehicle deployment regions by vehicle, vehicle type, or required response time. For example, display of vehicle deployment regions for police cars within a geographic area can be enabled or disabled by setting or clearing, respectively, a checkbox in a user interface element. In another example, display of vehicle deployment regions for an individual service vehicles can be enabled or disabled by setting or clearing, respectively, a checkbox in a user interface element for the individual service vehicle. Other techniques for enabling or disabling display of individual or groups of vehicle deployment regions are possible and the examples provided above are merely exemplary.

In some embodiments, vehicle deployment regions may be determined in part by street-level data. In some embodiments, street-level data comprises information reflecting the physical topology of streets ("street topology information") within a geographic area. For example, street topology information may include information reflecting the existence of and geographic coordinates (e.g., latitude and longitude) of streets and intersections within a geographic area.

In some embodiments, street-level data may reflect travel constraints imposed by street topologies, such as the presence of an off-ramp from a highway to a first surface street or the absence of an off-ramp from the highway to a second surface street. In these embodiments, travel constraints may reflect a crossing of a first street over a second street providing a physical street topology that allows for specific transfers or turns from the first street to the second street but reflecting that other turns between the two streets are not physically possible. In some embodiments, travel constraints imposed by street topologies may preclude vehicles above a certain height from traveling through a street segment or intersection due to the presence of a low bridge or other obstacle over that street segment or near that intersection.

In some embodiments, street-level data may comprise travel constraints imposed by local traffic rules. For example, travel constraints may include information reflecting that some streets are two-way streets while other streets are one-way streets. In some embodiments, travel constraints may include information reflecting that some turns are allowed under local traffic rules while other turns are disallowed under those rules; e.g., right turns from First Avenue to Second Street are allowed but left turns from First Avenue to Second Street are disallowed.

In some embodiments, travel constraints may vary by day of the week and/or time of day. For example, travel constraints may reflect that right turns from First Avenue to Second Street are disallowed during one or more predefined time periods such as peak traffic times on weekdays but are allowed during other times. In some embodiments, travel constraints may arise due to temporary conditions such as traffic accidents, parades, or street closures. Other temporary or time-based travel constraints are possible and the examples provided above are merely exemplary.

In some embodiments, travel constraints may apply to some vehicle types but not other vehicle types. For example, travel constraints may apply to police cars or ambulances not currently responding to an emergency (e.g., police cars on patrol) but may not apply to police cars or ambulances currently responding to an emergency. In another example, travel constraints may preclude commercial vehicles or through traffic from entering certain residential neighborhoods but may not apply to non-commercial vehicles or local traffic. Other travel constraints based on vehicle type or other considerations are possible and the examples provided above are merely exemplary.

In some embodiments, the presence of certain information within street-level data may reflect the presence of a condition or a restriction while in other embodiments the absence of certain information within street-level data may reflect the presence of a condition or a restriction. For example, travel constraints for a geographic area may reflect all allowed turns between streets within the geographic area. In this example, an absence of information reflecting that a particular turn between two particular streets is allowed implies that this turn is disallowed.

In other embodiments, street-level data may contain information reflecting the presence and absence of conditions or restrictions. For example, travel constraints for a geographic area may reflect allowed turns between streets in the geographic area and may reflect disallowed turns between streets in the geographic area. Some embodiments may also utilize street-level data that both expressly reflects the presence or absence of some types of conditions or restrictions and implies the presence or absence of other types of conditions or restrictions through the absence or presence, respectively, of another condition or restriction.

In some embodiments, street-level data may comprise traffic data such as real-time traffic data, historical traffic data, computed traffic data, or data comprising some combination of these types of traffic data. In some embodiments, each type of traffic data may comprise information reflecting the average speed through street segments (or through intersections) within a geographic area. In some embodiments, an estimated time to traverse a street segment (or intersection) may be determined from the length of the street segment (or distance between street intersections), reflected in street topology information such as latitude and longitude coordinates of intersections and street termini, and the average speed through the street segment (or intersection). In other embodiments, an estimated time to traverse a street segment (or intersection) may be determined through other heuristics or based on other day and the examples provided above are merely exemplary.

In some embodiments, real-time traffic data may reflect information gathered and put to use in actual or effective real time, such as data collected from street sensors and relayed through intermediate computing devices and/or data providers to systems described herein approximately as fast as the data can propagate from the street sensors to the systems described herein; e.g., one minute. In some embodiments, real-time traffic data includes information gathered from street sensors and relayed through intermediate computing devices and/or data providers to the systems described herein within a commercially reasonable period of time that is longer than the propagation delay from street sensors to systems described herein but is nonetheless commercially accepted as "real-time" traffic data; e.g., 1-30 minutes.

In some embodiments, historical traffic data reflects information gathered from street segments or intersections older than would be commercially accepted as real-time traffic data such as, for example, information gathered from particular street segments or intersections at a particular time of day on a particular day of the week and used to predict future traffic through the same street segments or intersections at the same time of day and the same day of the week. In some embodiments, historical traffic data may reflect information older than would be commercially accepted as real-time traffic data; e.g., data gathered hours ago. Although the preceding examples of real-time and historical traffic data distinguish traffic data types based on age of the traffic data, reflected in minutes or hours, the age-based examples provided above are merely exemplary.

In some embodiments, computed traffic data may reflect information estimated at least in part through heuristics involving street segment capacity and/or vehicle density. For example, computed traffic data for a street segment or intersection may estimate street capacity for the street segment or intersection based on factors such as the number of lanes that exist for travel in a particular direction. Computed traffic data for a street segment or intersection may also or alternatively estimate vehicle density for a street segment or intersection based on factors such as proximity of the street segment or intersection to highways, major venues such as shopping malls, and/or multi-unit housing complexes. Other factors may be considered when estimating street segment or intersection capacity and/or vehicle density and the examples provided above are merely exemplary.

Street-level data may be received, directly or indirectly, at least in part from a data provider and/or generated at least in part from one or more stored data sets. Street-level data from a data provider can comprise information received from a vendor such as, for example, INRIX, Inc., or aggregated from several vendors and/or other available sources. For example, a first vendor may provide some street-level data, such as real-time traffic data, and the real-time traffic data may be combined with stored data or data provided from a second vendor, such as street topology information including the existence of and geographic coordinates of streets and intersections within a geographic area. In some embodiments, street-level data may contain additional or fewer items of street and intersection information than those described above, including but not limited to information that may be customary in a specific industry or may be particular to a specific data provider such as INRIX, and the examples provided above are merely exemplary.

In some embodiments, street-level data can be updated manually through a user's request or automatically on a periodic basis by downloading a new set of street-level data from one or more data sources, thereby triggering recalculation of vehicle deployment regions for one or more vehicles, depending on user preferences or system requirements.

Embodiments of this disclosure include systems and methods for estimating a vehicle deployment region based at least in part on street-level data, a cost function, and a specified maximum cost such as a required response time. Estimating a vehicle deployment region for a specified maximum cost, such as a required response time, may involve several steps. For example, in some embodiments, street-level data may first be used to construct a graph data structure representing street segments and/or intersections.

In some embodiments, a node within the graph data structure corresponding to a particular geographic location may be identified as an origin node. In some embodiments, the particular geographic location may be a current vehicle deployment location while in other embodiments the particular geographic location may be a potential vehicle deployment location.

Thereafter, in some embodiments, a plurality of nodes may be identified within the graph data structure that are reachable from the origin node within a specified maximum cost such as a required response time. In some embodiments, the plurality of nodes is identified at least in part by Dijkstra's algorithm or a truncated form of Dijkstra's algorithm. From the identified plurality of nodes, in some embodiments, a plurality of geographic locations is identified, reflecting geographic locations that are reachable from the particular geographic location within the specified maximum cost.

Next, in some embodiments, a polygon representing a vehicle deployment region may be constructed based at least in part on the identified plurality of geographic locations. Construction of the vehicle deployment region may involve selecting some geographic locations within the identified plurality of geographic locations to form the vertices of a polygon while not selecting other geographic locations within the identified plurality of geographic locations. Subsequent to generating one or more vehicle deployment regions, in some embodiments, the vehicle deployment region(s) may be displayed on a map as illustrated in FIG. 2.

If multiple vehicle deployment regions have been constructed and/or displayed, gaps and/or redundancies in those deployment regions may be identified. In some embodiments, potential or current vehicle deployment locations can be adjusted in response to these gaps and/or redundancies and vehicle deployment regions can be updated to reflect such adjustments, thereby potentially reducing or eliminating the identified gaps or redundancies in vehicle deployment regions. Based on these adjustments, the average response time for service vehicles within a geographic area may improve. Each of the above steps is explained in further detail below with reference to exemplary embodiments of the present disclosure.

Figure 3:
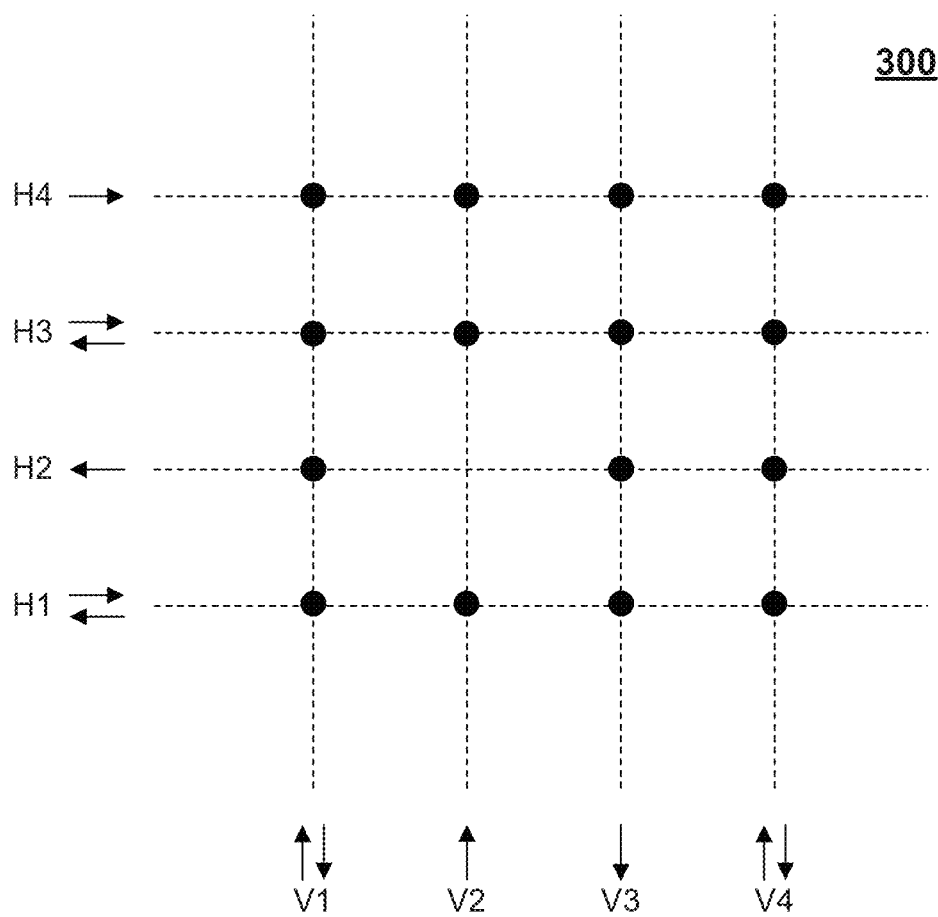
FIG. 3 illustrates street topology and travel constraint information for a geographic area reflected in street-level data, consistent with some embodiments of the present disclosure.

FIG. 3 illustrates street topology and travel constraint information for a geographic area included in street-level data 300, consistent with some embodiments of the present disclosure. As illustrated, street topology information in street-level data 300 reflects four east-west streets H1-H4 and four north-south streets V1-V4. Street topology information in street-level data 300 also reflects that streets H1-H4 cross or intersect streets V1-V4. Travel constraint information in street-level data 300 reflects two-way streets illustrated in FIG. 3 by arrows in two directions and one-way streets illustrated by arrows in only one direction. For example, streets H1, H3, V1, and V4 are illustrated as two-way streets while streets H2, H4, V2, and V3 are illustrated as one-way streets. These travel directions reflect one type of travel constraint reflected by information in street-level data 300, consistent with some embodiments.

In FIG. 3, intersections reflected in street topology information within street-level data 300 are illustrated as black dots. For example, within FIG. 3, the presence of a black dot at a meeting of lines for street V2 and street H3 illustrates that an intersection between those streets exists as reflected by street topology information in street-level data 300.

As previously discussed, in some embodiments, the presence of street topology information within street-level data 300 or the absence of street topology information in street-level data 300 may expressly and/or implicitly reflect intersections that do or do not exist and/or intersections that exist but do not allow turns between particular streets. For example, street-level data 300 may contain information expressly or implicitly reflecting that no allowable turn exists between street V2 and street H2. FIG. 3 illustrates the absence of such turns by the absence of a black dot at the location where lines for street V2 and street H2 meet. As previously discussed, street topology information within street-level data 300 may reflect travel constraints imposed by physical aspects of a roadway such as street V2 tunneling under street H2 rather than meeting street H2 at grade, combined with an absence of off-ramps between streets, thereby leading to a physical restriction that no turns between street V2 and street H2 are possible. As also previously discussed, street-level data 300 may also reflect travel constraints imposed by local traffic rules such as precluding by law all turns at the intersection of street V2 and street H2, thereby leading to a situation where turns between street V2 and H2 are physically possible but are disallowed by law.

The street topology reflected by information in street-level data 300 and illustrated in FIG. 3 is merely exemplary. Although FIG. 3 illustrates only a limited number of streets and intersections and also illustrates only north-south and east-west streets, information in street-level data 300 may reflect any number of streets, intersections, and street orientations.

In some embodiments, street-level data 300 may be used at least in part to generate at least one graph data structure. For example, consistent with some embodiments, a graph data structure may be constructed that comprises nodes for each intersection within a geographic area and edges for each street segment within the geographic area. Embodiments discussing this type of graph data structure are discussed in conjunction with FIG. 4. Consistent other embodiments, a graph data structure may be constructed that comprises nodes for each street segment within a geographic area and edges for each allowable path (e.g., turns or through connections) between street segments within the geographic area, as discussed in conjunction with FIG. 5. In other embodiments, a combination of these two approaches to creating a graph data structure may be employed.

In some embodiments, a graph data structure may be stored in a memory device or stored in a non-transitory computer-readable medium. Examples of such memory devices and media are discussed below in conjunction with FIG. 10. Additionally, in some embodiments, a graph data structure may be stored in one or more memory devices and/or other non-transitory computer-readable media. It will be appreciated from this disclosure that other techniques may be used for storing or replicating a graph data structures across one or more memories and/or non-transitory computer-readable media.

Figure 4:
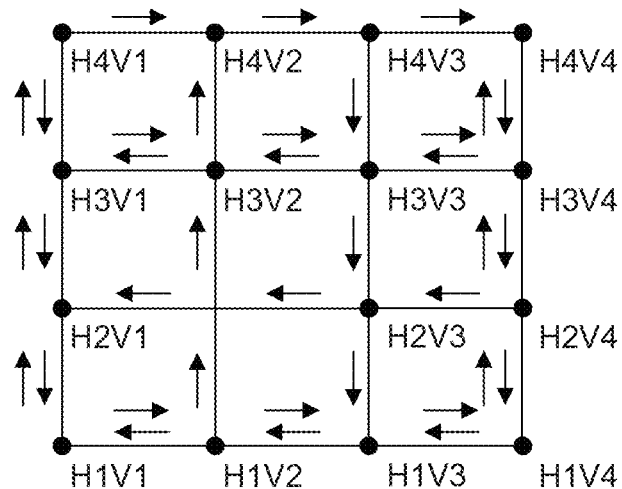
FIG. 4 depicts the structure of an exemplary graph data structure, consistent with some embodiments of the present disclosure.

FIG. 4 depicts the structure of an exemplary graph data structure 400, consistent with some embodiments of the present disclosure. As shown, graph data structure 400 comprises nodes (illustrated with black dots) and edges (illustrated with lines between nodes) representing intersections and street segments, respectively, generated from street-level data 300. More specifically, nodes in graph data structure 400 represent intersections between streets H1-H4 and V1-V4. For example, node H1V1 reflects an intersection between streets H1 and V1. Additionally, edges in graph data structure 400 represent street segments for streets H1-H4 and for streets V1-V4. For example, the edge between nodes H1 V1 and H1 V2 reflects a street segment for street H1 between intersections with streets V1 and V2.

Although exemplary graph data structure 400 contains information representing a limited number of street segments and intersections, as reflected by the limited number of edges and nodes illustrated in FIG. 4, exemplary graph data structure 400 may contain information reflecting a greater or fewer number of intersections and/or street segments consistent with embodiments of the present disclosure. Thus, graph data structure 400 of FIG. 4 is merely exemplary.

FIG. 4 also illustrates travel constraint information associated with street segments represented by edges in graph data structure 400, consistent with some embodiments. For example, streets H1, H3, V1, and V4 are illustrated in FIG. 3 as two-way streets and street segments for those streets are reflected in FIG. 4 as edges in graph data structure 400 comprising information reflecting two-directional travel through those street segments. Additionally, streets H2, H4, V2, and V3 are illustrated in FIG. 3 as one-way streets and street segments for those streets are reflected in FIG. 4 as edges in graph data structure 400 comprising information reflecting one-directional travel through those street segments.

In some embodiments, edges between two nodes may exist for each allowable direction of travel between those nodes. A graph data structure containing edges specific to particular directions of travel may be referred to as a "directed graph" data structure. For example, in embodiments utilizing a directed graph data structure to reflect the travel constraints illustrated in FIG. 3, two edges may exist between nodes reflecting intersections H1V1 and H1V2, comprising an edge for each allowable travel direction between those intersections. In another example utilizing a directed graph data structure, only one edge may exist between nodes reflecting intersections H2V3 and H2V4, reflecting that travel is only allowable in one direction between those intersections. Therefore, in a directed graph embodiment, each arrow illustrated in FIG. 4 may reflect an edge between two nodes.

Other types of travel constraints may be reflected by information associated with nodes or edges in graph data structure 400. For example, as discussed above, travel constraints may reflect allowable turns between corresponding street segments or intersections and may therefore be reflected in information within graph data structure 400. In other embodiments, other types of travel constraint information may be stored within graph data structure 400.

In other embodiments, travel constraint information may be stored outside of graph data structure 400 but associated with nodes or edges in graph data structure 400. For example, allowable turn information for each node within graph data structure 400 may be stored outside of graph data structure 400 but associated with corresponding nodes in graph data structure 400 through pointers or references to data stored outside graph data structure 400. Other mechanisms for storing travel constraint information in or relating travel constraint information to nodes or edges in a graph data structure are possible and the example provided above is merely exemplary.

Consistent with certain embodiments of the present disclosure, street-level data 300 and graph data structure 400 may be used to determine which nodes within graph data structure 400 are reachable from an origin node within a specified maximum cost. More specifically, street-level data 300 may be used to determine the cost to traverse paths through graph data structure 400, including travel between two nodes through one or more edges and potentially through intermediate nodes.

Consistent with some embodiments, traffic data, comprising information reflecting real-time, historical, and/or computed traffic data, may be used to determine average speeds through street segments or intersections. In some embodiments, average speeds through street segments or intersections may be used to determining which corresponding nodes within a graph data structure are reachable from an origin node within a specified maximum cost. In some embodiments, cost is determined by a cost function based at least in part on travel time. In some embodiments, as discussed above, travel time may be determined in part by real-time, historical, and/or computed traffic data reflecting an average speed through a street segment or intersection. However, other or additional considerations may factor into costs to reach each node within a graph data structure. For example, the cost function or graph data structure may reflect cost factors such as edges reflecting street segments that have a grade or incline greater than a predetermined amount and/or excluding or increasing the cost of travel on edges reflecting street segments that do not allow trucks above a predetermined height or weight.

In some embodiments, graph data structure 400 may contain cost information for each edge, reflecting the cost to traverse the edge's corresponding street segment. For example, the edge between nodes H2V3 and H1V3 may have a cost of 3, reflecting that the cost to traverse the street segment on street V3 between streets H1 and H2 is 3. When the exemplary cost function is based on time, any units of time can be utilized (e.g., seconds, minutes, hours, days).

In other embodiments, cost information may be stored outside of graph data structure 400 but associated with edges in graph data structure 400. For example, cost information for each edge within graph data structure 400 may be stored outside of graph data structure 400 but associated with corresponding edges in graph data structure 400 through pointers or references to data stored outside graph data structure 400. Other mechanisms for storing cost information in or relating cost information to nodes or edges in a graph data structure are possible and the example provided above is merely exemplary.

Referring again to the exemplary embodiments discussed above, if the cost function only considers travel time, a graph search algorithm such as Dijkstra's algorithm or a truncated form of that algorithm may determine which nodes within a graph data structure 400 are reachable within a required response time (e.g., 10 or 15 min) from a particular node (e.g., a node reflecting intersection H2V3 in graph data structure 400). Use of Dijkstra's algorithm, or a truncated form thereof, will be further appreciated in view of the exemplary embodiments described below with reference to FIGS. 6A-6D.

Figure 5:
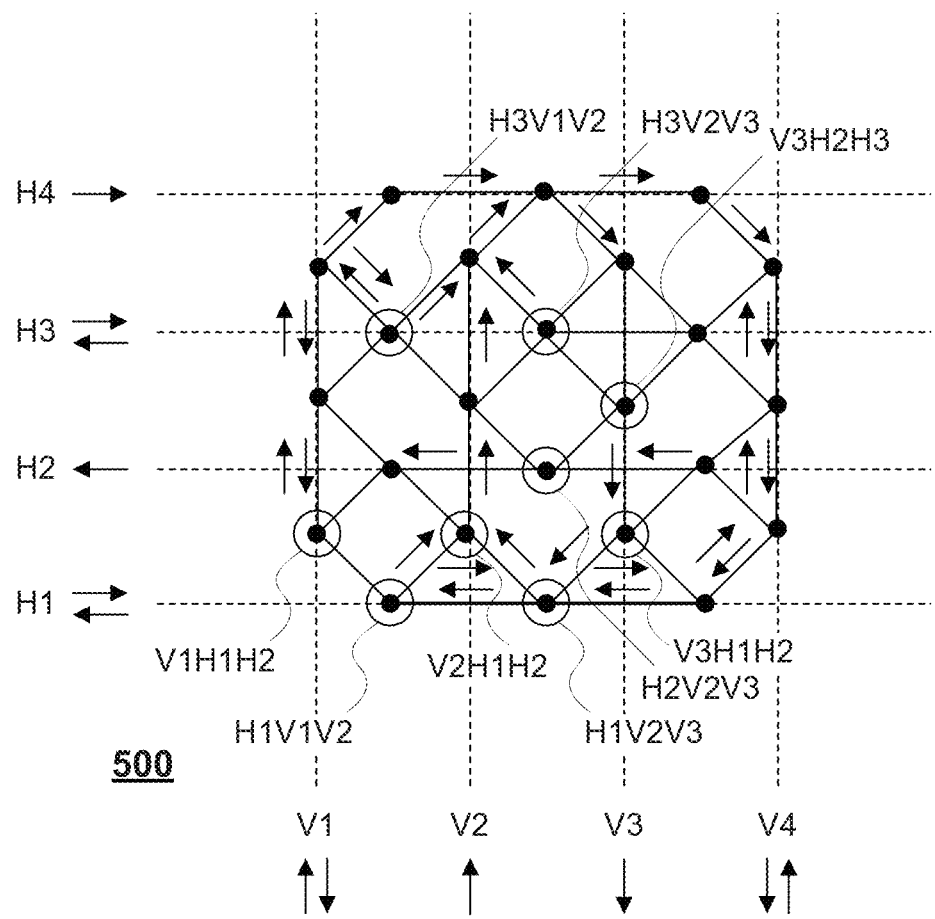
FIG. 5 depicts the structure of another exemplary graph data structure, consistent with some embodiments of the present disclosure.

FIG. 5 depicts the structure of another exemplary graph data structure 500, consistent with some embodiments of the present disclosure. As shown, graph data structure 500 comprises nodes and edges representing street segments and paths between street segments, respectively, generated from street-level data 300. More specifically, nodes in graph data structure 500 represent street segments for streets H1-H4 and for streets V1-V4. For example, node V2H1H2 represents a street segment on street V2 between streets H1 and H2. Additionally, edges in graph data structure 500 represent allowable paths between street segments. Allowable directions of travel for some paths between street segments are reflected in FIG. 5 with arrows but the allowable directions of travel for other paths between street segments were omitted from FIG. 5 for purposes of clarity. For example, the edge between nodes V2H1H2 and H1V2V3 reflects that a right turn is possible onto street V2 when traveling westbound on street H1.

In some embodiments, graph data structure 500 may be a directed graph data structure. As discussed above, a directed graph data structure may have one edge for each allowable direction of travel between two nodes. For example, graph data structure 500 may have two edges between nodes H1V1V2 and H1V2V3, comprising one edge for each allowable direction of travel between those nodes, and may have one edge between nodes H1V1V2 and V2H1H2, comprising a single edge representing the single allowable direction of travel between those nodes. In other embodiments, graph data structure 500 may not be a directed graph data structure but may contain information reflecting which directions of travel are allowable along each edge. In some embodiments, such directional information is stored within individual edges.

Consistent with certain embodiments of the present disclosure, street-level data 300 and graph data structure 500 may be used to determine which nodes within graph data structure 500 are reachable from an origin node within a specified maximum cost. More specifically, street-level data 300 may be used to determine the cost to traverse paths through graph data structure 500, including travel between two nodes through one or more edges and potentially through intermediate nodes.

In some embodiments, the cost to traverse from an edge's first node to its second node may reflect the cost to traverse the first node's corresponding street segment. More specifically, the edge reflects an allowable travel path from a street segment to a second street and the cost to traverse the edge may reflect the cost to traverse the first street segment (and reach the beginning of the second street segment but not proceed along the second street segment). For example, in graph data structure 500, the cost to traverse the edge from node V3H2H3 to node V3H1H2 may comprise the cost to traverse the street segment corresponding to node V3H2H3.

In some embodiments, cost information for an edge may be stored within a graph data structure while in other embodiments cost information for an edge may be stored outside of the graph data structure but associated with the graph data structure. For example, cost information for each edge within graph data structure 500 may be stored outside of graph data structure 500 but associated with corresponding edges in graph data structure 500 through pointers or references to data stored outside graph data structure 500. Other mechanisms for storing or relating cost information to edges in a graph data structure are possible and the example provided above is merely exemplary.

Although exemplary graph data structure 500 contains information representing a limited number of street segments and paths between street segments, as reflected by the limited number of nodes and edges illustrated in FIG. 5, exemplary graph data structure 500 may contain information reflecting a greater or fewer number of street segments and/or paths between street segments consistent with embodiments of the present disclosure. Thus, graph data structure 500 of FIG. 5 is merely exemplary.

Referring again to the exemplary embodiments discussed above, if the cost function only considers travel time, a graph search algorithm such as Dijkstra's algorithm or a truncated form of that algorithm may determine which nodes within graph data structure 500 are reachable within a required response time (e.g., 10 or 15 min) from a particular node (e.g., node V3H2H3). Use of Dijkstra's algorithm, or a truncated form thereof, will be further appreciated in view of the exemplary embodiments described below with reference to FIGS. 6A-6D.

Figure 6A:
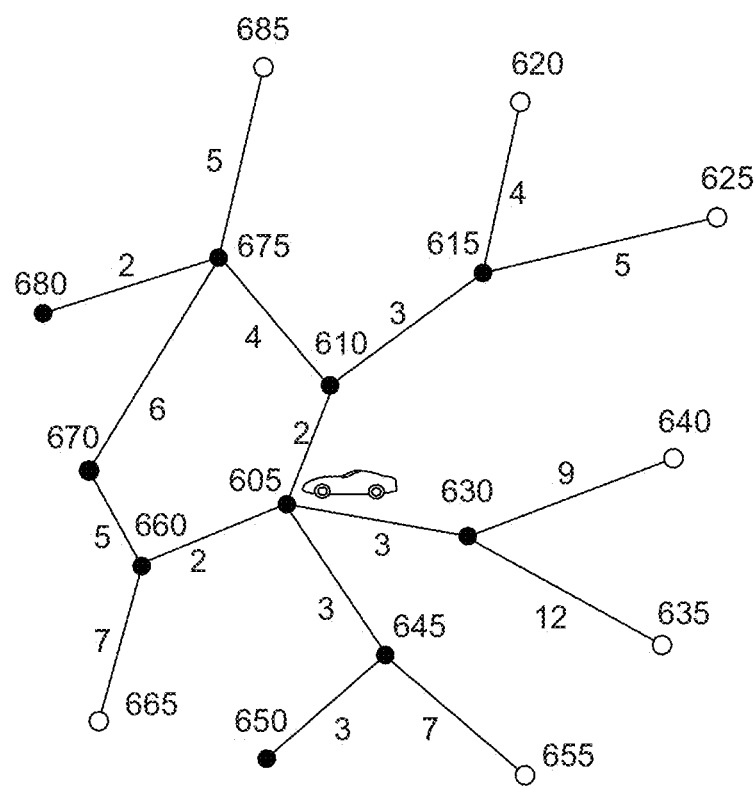
FIG. 6A depicts an exemplary graph data structure containing nodes and edges representing paths between nodes, consistent with some embodiments of the present disclosure.

FIG. 6A depicts an exemplary graph data structure 600 containing nodes and edges representing paths between nodes, consistent with some embodiments of the present disclosure. For example, graph data structure 600 contains a path from node 605 to node 670 through node 660.

Graph data structure 600 also directly or indirectly reflects the cost to traverse between each node. For example, graph data structure 600 reflects that the cost to directly traverse between node 605 and node 660 is 2. In addition, graph data structure 600 reflects that the cost to indirectly traverse between node 605 and node 650 is 6 based on a cost of 3 to traverse from node 605 to node 645 a cost of 3 to traverse from node 645 to node 650; i.e., a summation of these traversal costs is 6.

In some embodiments, a node within a graph data structure may be reachable by more than one path through the graph data structure. For example, in graph data structure 600, a path from origin node 605 to node 670 exists through intermediate node 660 and also through intermediate node 675. In this example, as illustrated in FIG. 6A, the cost to indirectly traverse from node 605 to node 670 through intermediate node 660 is 7 while the cost to indirectly traverse from node 605 to node 670 through intermediate node 675 is 12.

FIG. 6A further illustrates nodes that are directly or indirectly reachable from origin node 605 within a required response time of 8 minutes. For each node within graph data structure 600, the node's identifier and traversal costs from the node to other directly accessible nodes are illustrated in FIG. 6A.

For example, in FIG. 6A, an origin node for graph data structure 600 may be node 605. Additionally, graph data structure 600 reflects that nodes 630, 650, 660, and 670 are directly or indirectly reachable from origin node 605 within 3, 6, 2, and 7 minutes, respectively. Thus, these nodes (among others in graph data structure 600) are reachable within a required response time of 8 minutes and are illustrated in FIG. 6A as nodes with black dots. In some embodiments, the fact that a node is directly or indirectly reachable within a required response time from the origin node may be reflected as a Boolean value associated with that node or stored within graph data structure 600.

FIG. 6A also illustrates nodes that are not reachable within the required response time of 8 minutes. For example, graph data structure 600 reflects that nodes 655, 635, 640, and 625 are reachable by traversing through intermediate nodes from node 605 within 10, 15, 12, and 10 minutes, respectively. In contrast to those nodes reachable from origin node 605 within the required response time of 8 minutes, nodes 655, 635, 640, and 625 are unreachable within the required response time of 8 minutes and are therefore illustrated in FIG. 6A as nodes with white dots. In some embodiments, the fact that a node is neither directly nor indirectly reachable within a required response time from the origin node may be reflected as a Boolean flag or value associated with that node or stored in graph data structure 600.

In some embodiments, a plurality of nodes may be identified within a graph data structure that are reachable from an origin node within a specified maximum cost such as a required response time using multiple invocations of a form of Dijkstra's algorithm. In such embodiments, a single invocation of Dijkstra's algorithm may be used to determine a minimum cost to reach a single destination node from the origin node. In such embodiments, a form of Dijkstra's algorithm may be invoked once for each destination node (i.e., each node other than the origin node) to determine a minimum cost to traverse from the origin node to the destination node. For example, for graph data structure 600, a form of Dijkstra's algorithm may be invoked to determine the minimum cost to traverse from origin node 605 to node 630 and a form of Dijkstra's algorithm may separately be invoked to determine the minimum cost to traverse from origin node 605 to origin node 660. In these embodiments, each destination node being evaluated involves a separate invocation of Dijkstra's algorithm. Thereafter, nodes whose minimum cost does not exceed the specified maximum cost reflect nodes within the graph data structure that are reachable from the origin node within the specified maximum cost.

In some embodiments, a plurality of nodes may be identified within a graph data structure that are reachable from an origin node within a specified maximum cost such as a required response time using a single invocation of Dijkstra's algorithm. In such embodiments, a single invocation of Dijkstra's algorithm may be used to determine a minimum cost to reach each node from the origin node. Thereafter, nodes whose minimum cost does not exceed the specified maximum cost reflect nodes within the graph data structure that are reachable from the origin node within the specified maximum cost.

More specifically, using Dijkstra's algorithm may comprise selecting an origin node, initializing a provisional minimum cost for each node, and progressively evaluating nodes with the lowest provisional minimum cost not previously evaluated, starting from the origin node, while conditionally updating the provisional minimum cost of nodes directly reachable from the node being evaluated. Each of these steps is described below.

In some embodiments, using Dijkstra's algorithm may comprise selecting an origin node within a graph data structure. In some embodiments, the origin node reflects a node that corresponds to a particular geographic location, such as a current or potential vehicle deployment location.

In some embodiments, an origin node for a graph data structure may be selected by determining a node within the graph data structure whose corresponding geographic location is nearest to the particular geographic location. For example, if a police car is approaching the intersection of streets H2 and V3 illustrated in FIG. 3 and is closer to that intersection than to other intersections, and nodes in graph data structure 600 reflect intersections (see discussion of embodiments associated with FIG. 4), and that intersection corresponds to node 605 in graph data structure 600, node 605 may be selected as the origin node for graph data structure 600. In another example, if a police car is driving on street H1 between intersections with streets V2 and V3 as illustrated in FIG. 3, and nodes in graph data structure 600 reflect street segments (see discussion of embodiments associated with FIG. 5), and street segment H1V2V3 corresponds to node 605 in graph data structure 600, node 605 may be selected as the origin node for graph data structure 600.

In some embodiments, if a latitude and longitude (or other geographic location identifier) is known for a current or potential vehicle deployment location, through global positioning satellite data or other location tracking or identification technology, a node whose geographic location is nearest to that location can be identified from among nodes in a graph data structure. In other embodiments, an origin node can be identified through other determinations and these approaches to selecting an origin node within a graph data structure are merely exemplary.

In some embodiments, using Dijkstra's algorithm may comprise initializing a provisional minimum cost for each node in a graph data structure. As discussed further below, the provisional minimum cost for a node reflects an interim lowest cost to reach the node, from the origin node, while Dijkstra's algorithm progresses. The provisional minimum cost for a node could reflect its initialized value unmodified by Dijkstra's algorithm, an intermediate value reflecting a cost less than the initial cost but greater than its actual (final) minimum cost after completion of Dijkstra's algorithm, or its actual (final) minimum cost, as discussed further below.

During execution of Dijkstra's algorithm, the provisional minimum cost for a node may decrease as lower-cost paths are identified between the node and the origin node. For example, the provisional minimum cost for a node may be initialized to a value that is greater than the specified maximum cost (e.g., 10) and may take reduced values during iterations of Dijkstra's algorithm as lower-cost paths to the node are identified (e.g., identified paths with costs of 8 and 5 on separate iterations of Dijkstra's algorithm). After Dijkstra's algorithm completes, the provisional minimum cost for each node reflects the actual minimum cost to reach that node from the origin node; i.e., no paths with lower cost exist between the origin node and that node.

In some embodiments, an origin node is initialized with a provisional minimum cost of zero and other nodes in a graph data structure are initialized to a provisional minimum cost of infinity or an arbitrarily large number that exceeds a specified maximum cost. For example, for exemplary graph data structure 600 and a specified maximum cost of 8, origin node 605 may be initialized to a cost of zero and all other nodes may be initialized to a provisional minimum cost of greater than 8, such as 10. Thus, each node other than origin node 605 may be initialized with a provisional minimum cost reflecting that no path to that node, with a cost less than the specified maximum cost, has yet been identified. As discussed above, the provisional minimum cost for some nodes may decrease from the initialized provisional minimum cost as Dijkstra's algorithm progresses, reflecting identification of lower-cost paths to reach those nodes.

In some embodiments, the provisional minimum cost for a node is stored within the graph data structure while in other embodiments the provisional minimum cost for a node may be stored outside the graph data structure but associated with the node; e.g., through a pointer or reference relating a provisional minimum cost for a node to the node. Other mechanisms for storing provisional minimum costs in or relating provisional minimum costs to nodes in a graph data structure are possible and the examples discussed above are merely exemplary.

In some embodiments, using Dijkstra's algorithm may comprise initializing a graph data structure to reflect that each node in the graph data structure has a status reflecting that the node has not previously been evaluated ("visited"), as discussed further below. In some embodiments, evaluation status of a particular node may be reflected by a Boolean flag (e.g., a one-bit indication) or Boolean value (e.g., an integer value) although other mechanisms for storing evaluation status are possible and the examples above are merely exemplary.

In some embodiments, evaluation status of a particular node may be stored within the graph data structure while in other embodiments evaluation status for a node may be stored outside the node but associated with the node; e.g., through a pointer or reference relating an evaluation status for a node to the node. Other mechanisms and data types for storing evaluation status in or associating evaluation status with a node are possible and the examples discussed above are merely exemplary.

In some embodiments, evaluating a node while conditionally updating provisional minimum costs of nodes directly reachable from the node being evaluated comprises the steps of selecting nodes not previously evaluated but directly reachable from the node being evaluated, and updating the provisional minimum cost of each selected node if the current path to the selected node is a lower-cost path than previously identified paths to that node. More specifically, the provisional minimum cost of a selected node is updated if a sum of the provisional minimum cost for the node being evaluated and the cost to traverse from the node being evaluated to the selected node is less than the current provisional minimum cost of the selected node.

For example, evaluating node 615 within graph data structure 600 while conditionally updating provisional minimum costs for nodes directly reachable from node 615 comprises selecting nodes not previously evaluated (e.g., node 620 and 625; node 610 was presumably already evaluated because it is along the path from origin node 605 to node 615 and "progressive evaluation" follows such paths as discussed further below). For directly reachable node 620, a sum of the provisional minimum cost for node 615 (5) and the cost to traverse from node 615 to node 620 (4) equals 9. If the current provisional minimum cost for node 620 is greater than 9 (i.e., greater than the current sum), the current path to node 620 has lower cost than any previously identified path to node 620, so node 620's provisional minimum cost is updated to be 9 reflecting that the current path is a lower-cost path to reach node 620 from node 605 than those paths previously identified (if any). A corresponding summation, comparison, and conditional update is performed for directly reachable node 625, reflecting the remaining directly reachable node from node 615.

In some embodiments, using Dijkstra's algorithm comprises progressively performing the evaluation discussed above. For example, progressively performing the evaluation discussed above may comprise evaluating nodes in increasing order of provisional minimum cost. In some embodiments, a priority queue may store nodes not previously evaluated in order of provisional minimum cost and may allow for nodes not previously evaluated to be retrieved in ascending order of nodes' provisional minimum cost.

Figure 6B:
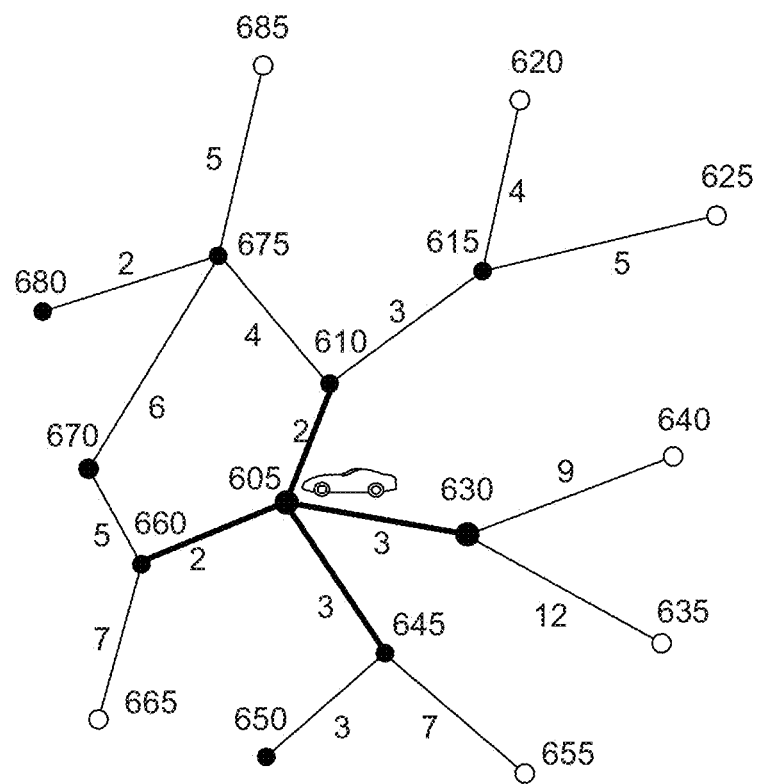
FIG. 6B depicts nodes within an exemplary graph data structure directly reachable from an origin node, consistent with some embodiments of the present disclosure.
Figure 6C:
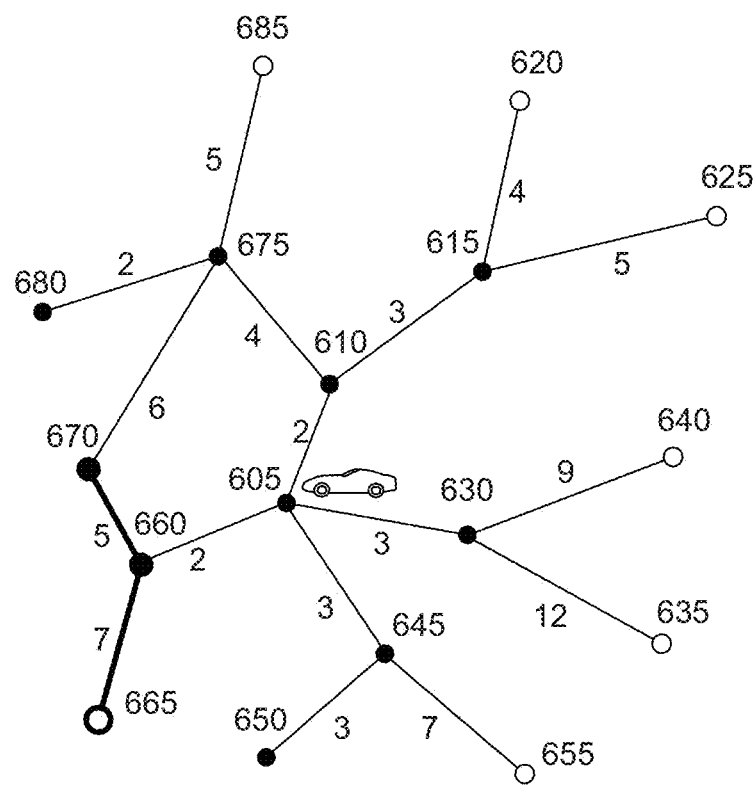
FIG. 6C depicts nodes within an exemplary graph data structure directly reachable from a second node and not previously evaluated, consistent with some embodiments of the present disclosure.
Figure 6D:
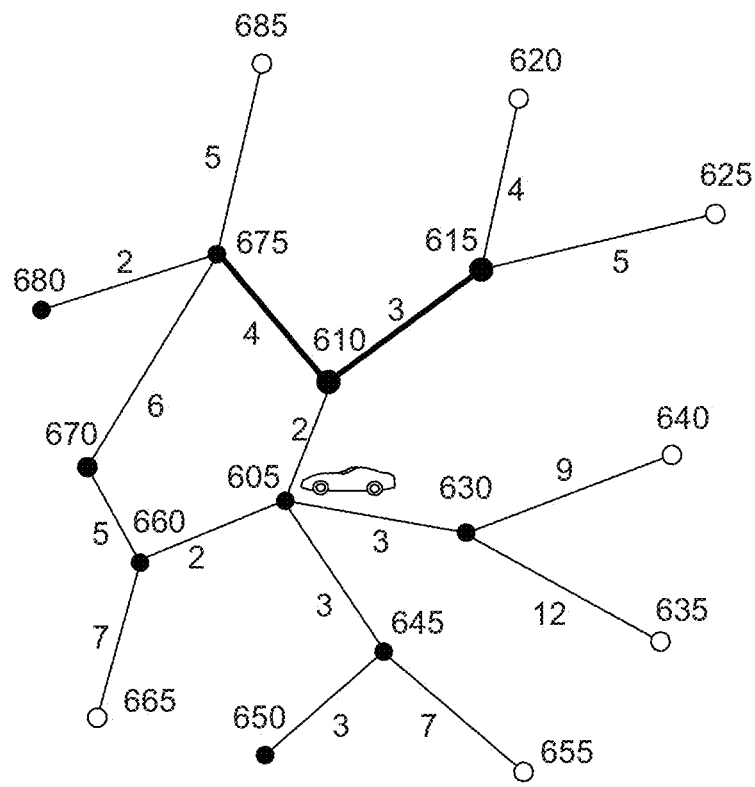
FIG. 6D depicts nodes within an exemplary graph data structure directly reachable from a third node and not previously evaluated, consistent with some embodiments of the present disclosure.

For example, Dijkstra's algorithm operating on graph data structure 600 may begin with origin node 605, whose initial provisional minimum cost is zero by design, which leads to determining provisional minimum costs for four nodes directly reachable from node 605 (highlighted in FIG. 6B). Thereafter, a node with the lowest provisional minimum cost (node 660 or node 610, each of which are directly reachable from origin node 605 at a cost of 2) is evaluated. If Dijkstra's algorithm evaluates node 660 before evaluating node 610, Dijkstra's algorithm will determine provisional minimum costs for two nodes directly reachable from node 660 but not previously evaluated (highlighted in FIG. 6C). Thus, a list of nodes not previously evaluated after evaluation of node 660, in ascending order of provisional minimum cost, would be node 610 (provisional minimum cost of 2), node 670 (provisional minimum cost of 7), and node 665 (provisional minimum cost of 9) followed by all nodes not reachable (with initialized values). Thereafter, node 610 is progressively evaluated (see FIG. 6D), leading to node 675 (provisional cost of 6) and node 615 (provisional cost of 5) being added to the list of nodes not previously evaluated. In some embodiments, Dijkstra's algorithm may continue progressively evaluating each node in graph data structure 600 until all nodes in graph data structure 600 have been evaluated.

In some embodiments, some nodes may be evaluated less than one time. For example, nodes retrieved from a priority queue may not be evaluated if they do not have edges to nodes not yet evaluated, because the only edges to such nodes involve nodes already evaluated. For example, node 685 only has one edge (to node 675) and node 675 would have been evaluated prior to evaluating node 685 (based on the progressive nature of Dijkstra's algorithm), so node 685 may not be evaluated. In these embodiments, not evaluating such nodes may reflect an optimization that improves the efficiency of Dijkstra's algorithm.

Although Dijkstra's algorithm, as discussed above, can provide efficiencies by potentially avoiding loops and redundancies (such as two potential paths to reach node 670), additional optimizations are possible that may improve the efficiency of Dijkstra's algorithm when identifying nodes that are reachable and/or not reachable within a specified maximum cost. As discussed within this disclosure, a "truncated form of "Dijkstra's algorithm" refers to an optimization of Dijkstra's algorithm that improves upon Dijkstra's algorithm by further reducing the number of nodes evaluated based on provisional minimum costs for those nodes, as discussed below.

In some embodiments, a truncated form of Dijkstra's algorithm only evaluates nodes whose provisional minimum cost is less than the specified maximum cost (i.e., nodes whose provisional minimum cost reflects that the nodes can be reached within the specified maximum cost). Limiting evaluation to such nodes may avoid evaluation of nodes that could not lead to identifying additional nodes with provisional minimum costs less than the specified maximum cost. Thus, a truncated form of Dijkstra's algorithm may reflect a more efficient method of identifying nodes that are reachable in a graph data structure within a specified maximum cost than Dijkstra's algorithm.

For example, for a specified maximum cost of 8, node 685 within graph data structure 600 can be ignored rather than evaluated because it is not reachable within a specified maximum cost of 8. Therefore, any node only reachable through node 685 must also have a provisional minimum cost greater than the provisional minimum cost for node 685. Thus, in some embodiments, the truncated form of Dijkstra's algorithm does not evaluate nodes whose provisional minimum cost exceeds the specified maximum cost, nor does the truncated form of Dijkstra's algorithm evaluate nodes only reachable from such nodes, and may therefore realize efficiencies from not evaluating nodes of these types.

In some embodiments, a truncated form of Dijkstra's algorithm can be implemented using at least in part a priority queue. For example, if a node retrieved from a priority queue has a provisional minimum cost greater than the specified maximum cost, progressive evaluation of nodes (and the truncated form of Dijkstra's algorithm overall) can stop because all nodes in the priority queue have provisional minimum costs greater than the specified maximum cost (due to the nature of the priority queue) and thus reflect nodes that are not reachable within the specified maximum cost. Accordingly, upon receiving a node from the priority queue whose provisional minimum cost is greater than the specified maximum cost, a truncated form of Dijkstra's algorithm may recognize that all nodes reachable within the specified maximum cost have been identified. Accordingly, a truncated form of Dijkstra's algorithm may stop upon such recognition.

In some embodiments reflecting intersections and street termini as nodes in a graph data structure (i.e., embodiments employing a graph data structure consistent with that illustrated in FIG. 4), a geographic location may be determined for each node within the graph data structure that is reachable within the specified maximum cost. For example, in some embodiments, the latitude and longitude of intersections and street termini may be known from street-level data. Thus, a latitude and longitude may be determined for each node, reflecting a geographic location for that node.

In some embodiments reflecting intersections and street termini as nodes in a graph data structure, a geographic location may be determined for portions of street segments that are reachable within the specified maximum cost. For example, if graph data structure 600 reflected intersections and street termini as nodes, for a specified maximum cost of 8, node 665 in graph data structure 600 may not be reachable because the minimum cost to reach node 665 is greater than 8 (i.e., the minimum cost to reach node 665 is 9) but a portion of the street segment associated with nodes 665 and 660 in graph data structure 600 may be traversed within the specified maximum cost of 8.

In some embodiments reflecting intersections and street termini as nodes in a graph data structure, a portion of a street segment that is reachable within a specified maximum cost may be determined by linearly interpolating between endpoints of the street segment. For example, for a specified maximum cost of 8, a point six-sevenths of the distance from node 660 to node 665 along the edge between those nodes, reflecting a traversal cost of 8 from origin node 605, could be established through linear interpolation and would reflect a location along the edge between nodes 665 and 660 that was reachable within the specified maximum cost of 8. In such embodiments, the geographic location for the point along a street segment associated with the edge can be determined by linearly interpolating between geographic locations for the endpoints of the street segment.

In some embodiments reflecting street segments as nodes in a graph data structure (i.e., embodiments employing a graph data structure consistent with that illustrated in FIG. 5), a geographic location may be determined for the trailing endpoint of each street segment whose corresponding node is reachable within the graph data structure within the specified maximum cost; i.e., if a node is reachable within the specified maximum cost, the entire length of the node's corresponding street segment is reachable within the specified maximum cost. In some embodiments, the trailing endpoint of a street segment is the endpoint, among two endpoints for each street segment comprising the trailing endpoint and a leading endpoint, that is furthest from an origin node's corresponding geographic location along a path from the origin node's corresponding geographic location to the node reflecting the street segment's corresponding geographic location.

For example, for graph data structure 500, node V3H2H3 may be an origin node and a path may exist from the origin node through node V3H1H2 to node H1V2V3. In this example, the trailing endpoint of the street segment reflected by node H1V2V3 may be the intersection of street H1 and V2 because that intersection is furthest from the origin node's corresponding geographical location along a path from the origin node's corresponding geographical location to the corresponding geographical location for the node reflecting the street segment on street H1 between streets V2 and V3.

In some embodiments reflecting street segments as nodes in a graph data structure, a geographical location may be determined for portions of edges within a graph data structure that are reachable within the specified maximum cost. For example, for a specified maximum cost of 8, node 665 in graph data structure 600 may not be reachable because the minimum cost to reach node 665 is greater than 8; i.e., the minimum cost to reach node 665 is 9. However, a portion of the edge between nodes 665 and 660 in graph data structure 600 may be traversed within the specified maximum cost of 8.

In some embodiments, a portion of an edge that is reachable within a specified maximum cost is determined by linearly interpolating between endpoints of the edge, from a leading endpoint of the edge. For example, for a specified maximum cost of 8, a point six-sevenths of the distance from node 660 to node 665 along the segment between those nodes, reflecting a traversal cost of 8 from origin node 605, could be established through linear interpolation and would reflect a graphical location along the edge between nodes 665 and 660 that was reachable from origin node 605 within the specified maximum cost of 8. A leading endpoint of an edge is that endpoint, among the two endpoints for an edge, that is closest to an origin node along a path.

In some embodiments reflecting street segments as nodes in a graph data structure, a geographical location reflecting a portion of a street segment that is reachable within specified maximum cost can be determined from a portion of an edge that is reachable within the specified maximum cost. In these embodiments, the geographical location may be identified by linearly interpolating between the corresponding intersections for the street segment. The position of the interpolated geographical location along the street segment (relative to the street segment's endpoints) is proportional to the position of the graphical location along the edge (relative to the edge's endpoints). Thus, for the example discussed above involving a graphical location six-sevenths of the distance from node 660 to node 665, the geographical location would be six-sevenths of the distance from the leading endpoint of the street segment reflected by node 660 toward the trailing endpoint of that street segment.

In some embodiments, a potential deployment space reflects a collection of geographic locations that are reachable within the specified maximum cost. In some embodiments, a vehicle deployment region can be determined by partitioning the potential deployment space into sub-regions and selecting geographic locations within each sub-region that are furthest from a particular geographic location (corresponding to a current or potential vehicle deployment location). This vehicle deployment region may be displayed on a map, potentially in the presence of vehicle deployment regions for other vehicles of the same or different types, to allow a service provider to visually determine that vehicle deployment efficiencies and coverage areas are adequate or should be adjusted. In some embodiments, within a sub-region, selection of the furthest geographic location from a current or potential vehicle deployment location reflects that geographic locations nearer to the current or potential deployed vehicle location within that sub-region are also reachable within the specified maximum cost.

Figure 7:
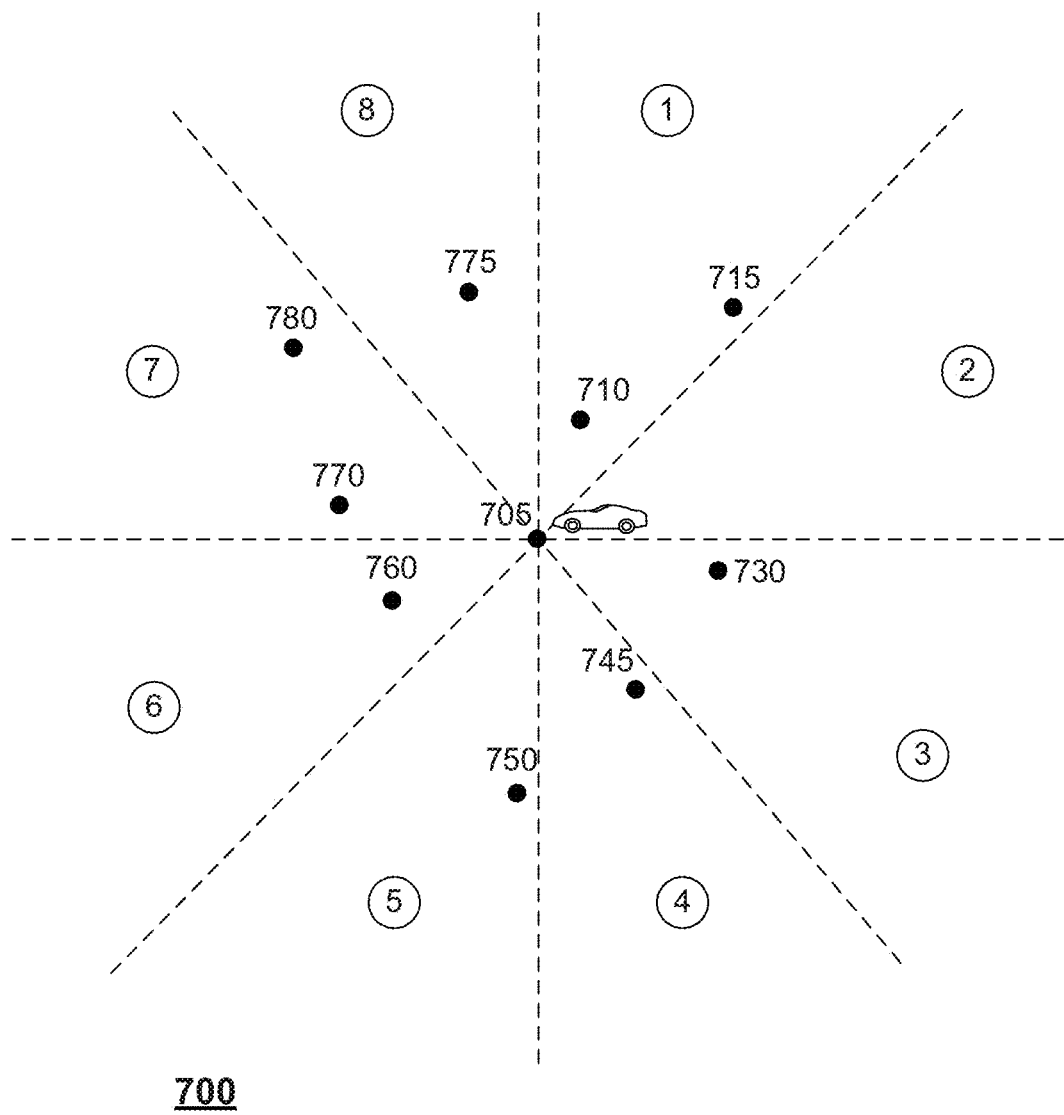
FIG. 7 depicts a plurality of angular space regions and geographic locations reachable within a specified maximum cost, consistent with some embodiments of the present disclosure.

In some embodiments, a potential deployment space is partitioned by dividing the angular space around a current or potential deployed vehicle location into a plurality of angular regions. FIG. 7 depicts a plurality of angular space regions and geographic locations 700 reachable within a specified maximum cost, consistent with some embodiments of the present disclosure. FIG. 7 illustrates an exemplary embodiment employing a partitioning of the angular space into eight angular space regions, such that each angular space region comprises forty-five degrees. As shown, angular space region 1 includes geographic locations 710 and 715 that are reachable within a specified maximum cost, angular space region 2 includes no geographic locations that are reachable within the specified maximum cost, and angular space region 3 includes geographic location 730 that is reachable within the specified maximum cost. Thus, FIG. 7 illustrates that each angular space region can contain no geographic locations reachable within a specified maximum cost or any number of geographic regions reachable within a specified maximum cost.

Consistent with the present disclosure, partitioning an angular space into a particular number of angular space regions may involve selecting the number of angular space regions to use. Selecting the number of angular space regions to use may implicate tradeoffs between the granularity and accuracy of the computed result versus computation time and size of the resulting data structure(s). Thus, although the embodiment of FIG. 7 illustrates eight angular space regions, other embodiments with more than or less than eight angular space regions may be employed and may be beneficial for specific applications. For example, in some embodiments, twenty angular space regions may be beneficial.

As described above, within each angular space region, a geographic location reachable within a specified maximum cost and furthest from the current or potential deployed vehicle location may be selected. In some embodiments, a geographic distance between geographic locations is used to determine which geographic location is furthest from the current or potential deployed vehicle location. For example, within angular space region 1 in FIG. 7, geographic location 715 may be further from current or potential deployed vehicle location 705 than geographic location 710, so geographic location 715 may be selected. This process may be repeated for each angular space region with at least one geographic location that is reachable within the specified maximum cost.

Figure 8:
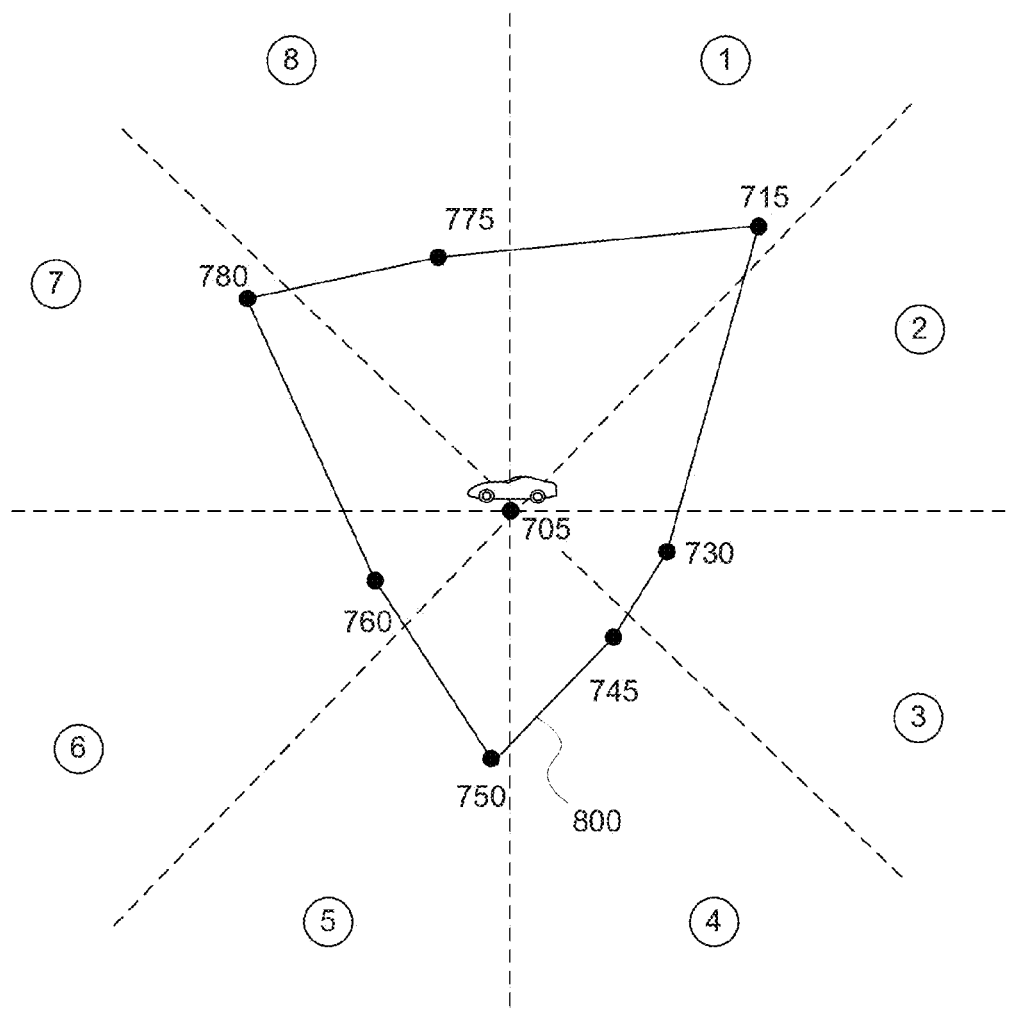
FIG. 8 depicts geographic locations that result from selecting the furthest geographic location from the current or potential deployed vehicle location for each angular space region from the collection of geographic locations and forming a vehicle deployment region from those locations, consistent with some embodiments of the present disclosure.

FIG. 8 depicts geographic locations that result from selecting the furthest geographic location from the current or potential deployed vehicle location for each angular space region from the collection of geographic locations and forming vehicle deployment region 800 from those locations, consistent with some embodiments of the present disclosure.

In the exemplary embodiment of FIG. 8, vehicle deployment region 800 is formed by connecting geographic locations furthest from the current or potential deployed vehicle location for each angular space region to geographic locations in nearest-neighbor angular space regions. In some embodiments, a vehicle deployment region can be formed by connecting the furthest geographic location from the current or potential deployed vehicle location for each angular space region with that geographic location's nearest-neighbor, furthest geographic location in a clockwise and/or counter-clockwise manner or alternatively in any order. For example, as illustrated in FIG. 8, geographic location 775 in angular space region 8 is connected to geographic location 715 in angular space region 1. In another example, geographic location 715 in angular space region 1 is connected to geographic location 730 in angular space region 3, reflecting a nearest-neighbor connection, because no geographic locations that are reachable within the specified maximum cost exist within angular space region 2.

Vehicle deployment regions formed by connecting nearest-neighbor, furthest geographic locations, as illustrated in FIG. 8, reflect a reasonable estimate of the area that a vehicle located at a current or potential deployed vehicle location (e.g., geographic location 705) can reach within the specified maximum cost (e.g., with a required response time of 8 minutes).

In some embodiments, vehicle deployment regions generated as discussed above can be used to identify gaps and overlaps in vehicle deployment. For example, the vehicle deployment regions illustrated in FIG. 2 reflect that a large geographic gap exists between the areas reachable within a specified maximum cost by Vehicles 1 and 2. Recognizing this gap, a service provider could deploy additional vehicles into the geographic gap or could move one or both of Vehicles 1 or 2 to reduce or eliminate the gap. Upon identifying a new potential vehicle deployment location for Vehicle 1 and/or 2, vehicle deployment region(s) for the new potential vehicle deployment location(s) could be determined and overlaid on the map shown in FIG. 2 to confirm that a more effective deployment (e.g., a reduced gap in coverage) would be realized by such vehicle deployment location(s).

In some embodiments, a similar approach can be taken to reduce or eliminate overlapping vehicle deployments. If, for example, the vehicle deployment regions for Vehicles 1 and 2 illustrated in FIG. 2 were overlapping to some extent, a new potential vehicle deployment location for Vehicles 1 and/or 2 could be identified and new vehicle deployment region(s) for the new vehicle deployment location(s) could be determined to confirm that the new vehicle deployment location(s) would reduce or eliminate vehicle deployment overlap.

Figure 9A:
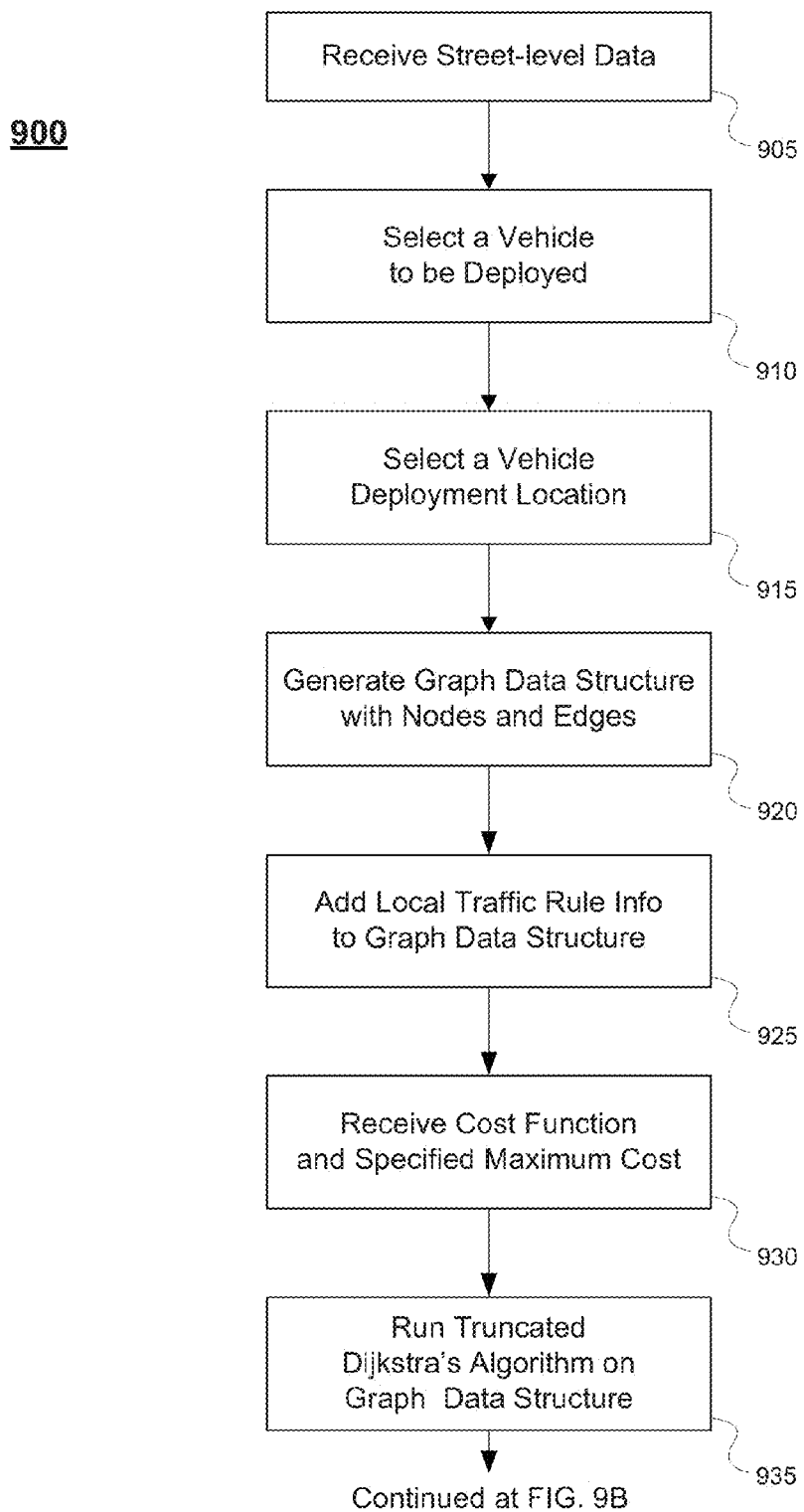
FIGS. 9A and 9B depict a flowchart representing an exemplary method for computing a vehicle deployment region, consistent with some embodiments of the present disclosure.
Figure 9B:
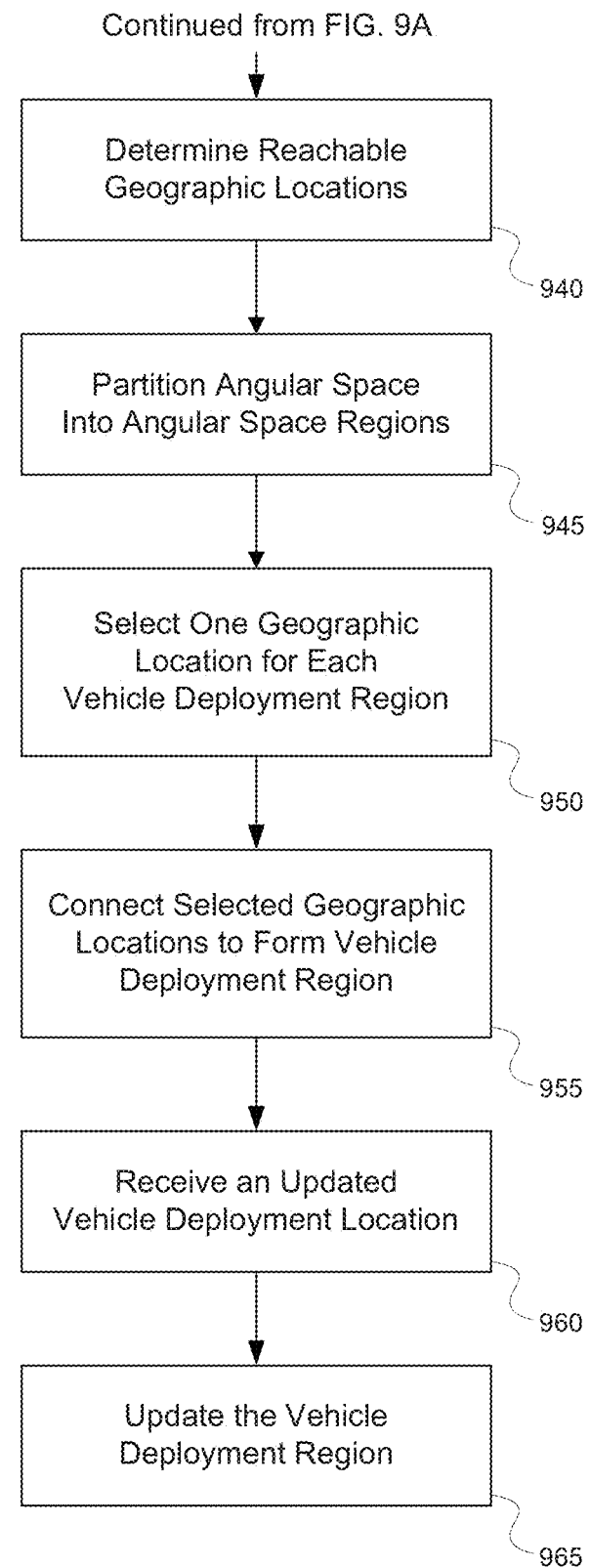

FIGS. 9A and 9B depict a flow chart representing an exemplary method 900 for computing a vehicle deployment region, consistent with some embodiments of the present disclosure. The examples discussed below use a travel-time-based cost function and a required response time as a specified maximum cost, but are applicable to other cost functions and specified maximum costs as discussed above.

In step 905, street-level data may be received at one or more processors of a computer system (such as the computer system described below with reference to FIG. 10). In some embodiments, the received street-level data may comprise information reflecting one or more types of data including the physical topology of streets within a geographic area, travel constraints, real-time traffic data or historical traffic data (or a combination of real-time and historical traffic data). In other embodiments, utilizing cost functions other than or in addition to travel time, such as total elapsed distance, street-level data may comprise traffic data and other data or merely data of one or more other types.

In step 910, a vehicle to be deployed is selected for which a vehicle deployment region under a selected cost function and specified maximum cost will be computed.

In step 915, a current or potential vehicle deployment location is selected for the selected vehicle.

In step 920, a graph data structure is formed that comprises nodes and edges. In some embodiments, such as embodiments discussed in conjunction with FIG. 4, the graph data structure comprises a plurality of nodes, each of which represents a street intersection or street terminus within the geographic region, and comprises a plurality of edges, each of which represents a street segment between intersections and/or termini. In other embodiments, such as embodiments discussed in conjunction with FIG. 5, the graph data structure comprises a plurality of nodes, each of which represents a street segment within the geographic region, and comprises a plurality of edges, each of which reflects allowable paths such as turns between street segments.

In step 925, local traffic rule info is added to the graph data structure. In some embodiments utilizing a graph data structure with nodes reflecting intersections, such as embodiments discussed in conjunction with FIG. 4, local traffic rule information may be reflected in the graph data structure (or stored outside of the graph data structure but associated with the graph data structure) and considered during Dijkstra's algorithm or a truncated form thereof.

In other embodiments utilizing a graph data structure with nodes reflecting street segments, such as embodiments discussed in conjunction with FIG. 5, local traffic rule information may be reflected in the graph data structure in the form of edges reflecting paths between nodes that are allowed by law. In some embodiments, as discussed above, each edge between segments is directional; i.e., the graph data structure implements a directed graph.

In step 930, a cost function and/or a specified maximum cost may be received at the one or more processors of computer system 1000. In some embodiments, the cost function and/or cost limit can be received from a user operating computer system 1000 or operating a computer coupled to computer system 1000 through a network connection. In other embodiments, the cost function and/or specified maximum cost can be stored in memory or in a non-transitory computer-readable medium within computer system 1000. Yet in other embodiments, a third party or external source can provide the cost function and/or specified maximum cost.

In step 935, Dijkstra's algorithm or a truncated form of Dijkstra's algorithm is executed on the graph data structure.

In step 940, geographic locations that are reachable for a cost function and a specified maximum cost are determined by running Dijkstra's algorithm or a truncated form of Dijkstra's algorithm.

In step 945, a potential deployment space comprising the geographic locations determined in step 940, centered on a current or potential vehicle deployment location, can be partitioned into a plurality of angular space regions.

In step 950, each of the angular space regions can be evaluated to identify one geographic location for each angular space region containing a geographic location. In some embodiments, within an angular space region, a geographic location furthest from the current or potential deployment location is selected. In other embodiments, other or additional criteria can be evaluated when selecting a geographic location for each angular space region containing a geographic location.

In some embodiments, a particular angular space region may not contain any geographic locations. For example, angular space region 2 of FIG. 7 does not contain a geographic location that can be reached within the specified maximum cost. In such situations, it may desirable, in some embodiments, to select a potential vehicle deployment location other than the potential or current vehicle deployment location that results in angular space regions containing at least one geographic location for each angular space region.

In step 955, the identified geographic locations can be interconnected to form a polygon that represents a vehicle deployment region consistent with some embodiments of the present disclosure. For example, FIG. 8 illustrates a plurality of geographic locations identified from the plurality of geographic locations illustrated in FIG. 7. As will be appreciated from this disclosure, the above-described polygon formation can utilize any known method of drawing a polygon from a plurality of points. The polygon that results is a vehicle deployment region, consistent with some embodiments of the present disclosure. This vehicle deployment region may be positioned and overlaid on a map such as the map of FIG. 2.

In step 960, the location of the deployed vehicle can be updated, potentially in response to detected gaps or overlaps in vehicle deployment regions. In some embodiments, the updated location can be received as user input. In other embodiments, the updated location can be read from a database based on certain predetermined criteria or through any other conventional method of receiving input. In still other embodiments, the location of a deployed vehicle can be updated algorithmically. For example, for the exemplary vehicle deployments illustrated in FIG. 2, vehicle deployment locations for Vehicles 1 and 2 can be updated to deploy Vehicles 1 and 2 along a line between the current vehicle deployment locations for Vehicles 1 and 2 such that each vehicle is moved one-half of the distance between the nearest edges of the current vehicle deployment regions for Vehicles 1 and 2. This position update will approximately eliminate the gap between vehicle deployment regions for Vehicles 1 and 2.

In step 965, the vehicle's deployment region is updated for the vehicle's updated vehicle deployment location. A corresponding updated vehicle deployment region can be computed, as described above, by repeating at least some of steps 900-955, using the vehicle's updated vehicle deployment location as a geographic location for selecting the origin node of a graph for such computations. The updated vehicle deployment region can then be output for further use including communication to a corresponding real vehicle. This step of updating a vehicle's deployment region can be repeated for all deployed vehicles and/or can be repeated multiple times for individual deployed vehicles resulting in an updated coverage map for deployed vehicles. In some embodiments, vehicle deployment regions may be generated and/or updated for multiple vehicles and overlaid on a single map. In some embodiments, vehicle deployment regions may be generated and/or updated and overlaid on a map for every vehicle within a predetermined area.

In some embodiments, one or more steps reflected in FIGS. 9A and 9B, including but not limited to the steps of updating the location of a deployed vehicle and updating the vehicle's deployment region to reflect the updated vehicle deployment location, may be optional. In some embodiments, the steps illustrated in FIGS. 9A and 9B may be executed in a different order than the order reflected in those figures.

FIG. 10 is a block diagram of an exemplary computer system 1000 within which the embodiments described herein can be implemented, consistent with some embodiments of the present disclosure. Computer system 1000 includes a bus 1002 or other communication mechanism for communicating information, and a hardware processor 1004 coupled with bus 1002 for processing information. Hardware processor 1004 can be, for example, a general purpose microprocessor or a special purpose microprocessor. In some embodiments, computer system 1000 can include a plurality of hardware processors, for example, plurality of hardware processor 1004.

Computer system 1000 also includes a main memory 1006, such as a random access memory (RAM) or other dynamic storage device, coupled to bus 1002 for storing information and instructions to be executed by processor 1004. Main memory 1006 also can be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 can be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. The input device typically has two degrees of freedom in two axes, a first axis (for example, x) and a second axis (for example, y), that allows the device to specify positions in a plane.

Computer system 1000 can implement the techniques described herein using customized hard-wired logic, one or more ASICs or FPGAs, firmware and/or program logic which in combination with the computer system causes or programs computer system 1000 to be a special-purpose machine. According to some embodiments, the techniques herein are performed by computer system 1000 in response to processor 1004 executing one or more sequences of one or more instructions contained in main memory 1006. Such instructions can be read into main memory 1006 from another storage medium, such as storage device 1010. Execution of the sequences of instructions contained in main memory 1006 causes processor 1004 to perform the process steps described herein. In alternative embodiments, hard-wired circuitry can be used in place of or in combination with software instructions.

The term "storage media" as used herein refers to any non-transitory media that store data and/or instructions that cause a machine to operate in a specific fashion. Such storage media can comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from, but can be used in conjunction with, transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media can be involved in carrying one or more sequences of one or more instructions to processor 1004 for execution. For example, the instructions can initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 can optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 922. For example, communication interface 1018 can be an integrated services digital network (ISDN) card, cable modem, satellite modem, or a modem to provide a data communication connection to a corresponding type of telephone line. As another example, communication interface 1018 can be a local area network (LAN) card to provide a data communication connection to a compatible LAN. Wireless links can also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 can provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 1020 and through communication interface 1018, which carry the digital data to and from Computer system 1000, are example forms of transmission media.

Computer system 1000 can send messages and receive data, including program code, through the network(s), network link 1020 and communication interface 1018. In the Internet example, a server 930 might transmit a requested code for an application program through Internet 928, ISP 926, local network 922, and communication interface 1018. The received code can be executed by processor 1004 as it is received, and/or stored in storage device 1010, or other non-volatile storage for later execution. In some embodiments, the system depicted in FIG. 13 can include a plurality of computer systems, each of which can be similar to computer system 1000.

In the foregoing specification, embodiments have been described with reference to numerous specific details that can vary from implementation to implementation. Certain adaptations and modifications of the described embodiments can be made. For example, with respect to the disclosed embodiments, components or steps can be eliminated, combined, or modified. Further, with respect to the disclosed exemplary methods or techniques, steps or operations may be reordered, combined, or modified, as needed. Therefore, the above discussed embodiments are considered to be illustrative and not restrictive.

What is claimed is:

1. A method for estimating a vehicle deployment region, the method comprising the following operations performed by one or more processors:
    partitioning an angular space centered on a vehicle location into a plurality of angular space regions;
    selecting, for at least three of the plurality of the partitioned angular space regions, a geographical location within the angular space region, each selected geographical location being reachable from the vehicle location within a specified maximum cost;
    forming a polygon representing a region from the selected geographical locations, wherein each selected geographical location in an angular space region is a geographical location furthest from the vehicle location; and
    presenting information concerning the region to a user.

2. The method of claim 1, wherein each geographical location is determined using a graph data structure.

3. The method of claim 2, wherein the graph data structure includes a plurality of nodes and each node of the plurality of nodes represents a street intersection.

4. The method of claim 3, wherein the graph data structure reflects restrictions imposed by local traffic rules.

5. The method of claim 4, wherein the graph data structure is constructed using a truncated form of Dijkstra's algorithm.

6. The method of claim 5, wherein an origin node within the plurality of nodes represents a street intersection nearest to the current or potential location of a vehicle.

7. The method of claim 6, wherein edges connect the nodes in the graph data structure and represent street segments.

8. The method of claim 7, further comprising:
    assigning traversal costs for edges based at least in part on street-level data associated with street segments corresponding to the edges.

9. The method of claim 8, wherein the traversal cost of an edge is based at least in part on the time it would take to traverse a street segment corresponding to the edge.

10. The method of claim 8, wherein the street-level data includes real-time traffic data.

11. The method of claim 8, wherein the street-level data includes information representing a current average traffic speed for each street segment.

12. The method of claim 1, wherein presenting information concerning the estimated vehicle deployment region comprises:
    displaying the polygon by overlaying it on a map at the vehicle's current or potential deployment location.

13. A system for estimating a vehicle deployment region, the system comprising:
    a memory device that stores a set of instructions; and at least one processor that executes the set of instructions to perform the following operations:

partition an angular space centered on a vehicle location into a plurality of angular space regions, the vehicle location corresponding to a current or potential location of a vehicle;

select, for at least three of the plurality of the partitioned angular space regions, a geographical location within the angular space region, each selected geographical location being reachable from the vehicle location within a specified maximum cost;

form a polygon representing a vehicle deployment region from the selected geographical locations, wherein each selected geographical location in an angular space region is a geographical location furthest from the vehicle location; and present, based on the polygon, information concerning the estimated vehicle deployment region to a user.

14. The system of claim 13, wherein each geographical location is determined using a data graph structure.

15. The system of claim 14, wherein the graph data structure includes a plurality of nodes and each node of the plurality of nodes represents a street intersection.

16. The system of claim 15, wherein the graph data structure reflects restrictions imposed by local traffic rules.

17. The system of claim 16, wherein the graph data structure is constructed using a truncated form of Dijkstra's algorithm.

18. The system of claim 17, wherein edges connect the nodes in the graph data structure and represent street segments.

19. The system of claim 18, wherein the set of instructions further cause the at least one processor to:

assign traversal costs for edges based at least in part on street-level data associated with street segments corresponding to the edges.

20. The system of claim 19, wherein the traversal cost of an edge is based at least in part on the time it would take to traverse a street segment corresponding to the edge.

21. The system of claim 20, wherein the street-level data includes information representing a current average traffic speed for each street segment.

22. The system of claim 13, wherein the set of instructions further cause the at least one processor to:

display the polygon by overlaying it on a map at the vehicle's current or potential vehicle deployment location.

23. A non-transitory computer-readable medium storing a set of instructions that are executable by one or more processors to cause the one or more processors to perform a method for estimating a vehicle deployment region, the method comprising:

partitioning an angular space centered on a vehicle location into a plurality of angular space regions, the vehicle location corresponding to a current or potential location of a vehicle;

selecting, for at least three of the plurality of the partitioned angular space regions, a geographical location within the angular space region, each selected geographical location being reachable from the vehicle location within a specified maximum cost;

forming a polygon representing a vehicle deployment region from the selected geographical locations, wherein each selected geographical location in an angular space region is a geographical location furthest from the vehicle location; and presenting, based on the polygon, information concerning the estimated vehicle deployment region to a user.

24. The computer-readable medium of claim 23, wherein each geographical location is determined using a graph data structure.

25. The computer-readable medium of claim 24, wherein the graph data structure includes a plurality of nodes and each node of the plurality of nodes represents a street intersection.

26. The computer-readable medium of claim 25, wherein the graph data structure reflects restrictions imposed by local traffic rules.

27. The computer-readable medium of claim 26, wherein the graph data structure is constructed using a truncated form of Dijkstra's algorithm.

28. The computer-readable medium of claim 27, wherein an origin node within the plurality of nodes represents a street intersection nearest to the current or potential location of a vehicle.

29. The computer-readable medium of claim 28, wherein edges connect the nodes in the graph data structure and represent street segments.

30. The computer-readable medium of claim 29, wherein the instructions further cause the one or more processors to assign traversal costs for edges based at least in part on street-level data associated with street segments corresponding to the edges.

31. The computer-readable medium of claim 30, wherein the traversal cost of an edge is based at least in part on the time it would take to traverse a street segment corresponding to the edge.

32. The computer-readable medium of claim 30, wherein the street-level data includes real-time traffic data.

33. The computer-readable medium of claim 30, wherein the street-level data includes information representing a current average traffic speed for each street segment.

34. The computer-readable medium of claim 30, wherein presenting information concerning the estimated vehicle deployment region comprises:

displaying the polygon by overlaying it on a map at the vehicle's current or potential deployment location.

* * * * *